United States Patent
Proulx et al.

(10) Patent No.: US 11,933,436 B2
(45) Date of Patent: Mar. 19, 2024

(54) CLAMP ASSEMBLY

(71) Applicant: Amphenol Corporation, Wallingford, CT (US)

(72) Inventors: Jeremi Proulx, St-Hubert (CA); Mathieu Desjardins, Montreal (CA); Dimitri Laflamme, Longueuil (CA); Rachid Ouallou, Chambly (CA)

(73) Assignee: Amphenol Corporation, Wallingford, CT (US)

( * ) Notice: Subject to any disclaimer, the term of this patent is extended or adjusted under 35 U.S.C. 154(b) by 59 days.

(21) Appl. No.: 16/914,247

(22) Filed: Jun. 26, 2020

(65) Prior Publication Data
US 2020/0408334 A1    Dec. 31, 2020

Related U.S. Application Data

(60) Provisional application No. 62/868,840, filed on Jun. 28, 2019.

(51) Int. Cl.
*F16L 3/12* (2006.01)
*F16G 11/10* (2006.01)
(Continued)

(52) U.S. Cl.
CPC .......... *F16L 3/1211* (2013.01); *F16G 11/108* (2013.01); *F16L 3/1075* (2013.01);
(Continued)

(58) Field of Classification Search
CPC . F16L 3/127; F16L 3/1211; F16L 3/13; F16L 3/1075; F16L 3/10; F16L 3/1033; F16G 11/108
See application file for complete search history.

(56) References Cited

U.S. PATENT DOCUMENTS 4,189,807 A    2/1980   Byerly
4,269,026 A *  5/1981   Bulle ..................... A44C 5/105
                                                          63/9

(Continued)

FOREIGN PATENT DOCUMENTS

JP    2007-107631 A    4/2007
JP    2008-218176 A   11/2008
WO   WO 03/001069 A1   1/2003

OTHER PUBLICATIONS

International Search Report and Written Opinion for International Application No. PCT/US2020/039999, dated Oct. 15, 2020.

(Continued)

*Primary Examiner* — Christopher Garft
(74) *Attorney, Agent, or Firm* — Wolf, Greenfield & Sacks, P.C.

(57) ABSTRACT

A method and apparatus for securing a bundle of wires to a surface via a clamp assembly is disclosed. The assembly includes a clamp, such as a P-clamp, that may be mounted to a support before installing a bundle of wires. The clamp includes first and second clamp members that cooperate to form an opening through which the wire bundle extends. The first and second clamp members may be engaged with and disengaged from one another without a tool. In some embodiments, the P-clamp includes a snap-in mechanism with a clip and a corresponding housing. In some embodiments, the clamp includes an inner cushion that allows the clamp to accommodate a range of wire bundle diameters.

26 Claims, 34 Drawing Sheets

(51) Int. Cl.
 *F16L 3/10* (2006.01)
 *F16L 3/127* (2006.01)
 *F16L 3/13* (2006.01)
 *H02G 1/04* (2006.01)
(52) U.S. Cl.
 CPC ............ *F16L 3/127* (2013.01); *F16L 3/13* (2013.01); *H02G 1/04* (2013.01)

(56) References Cited

U.S. PATENT DOCUMENTS

| | | | | |
|---|---|---|---|---|
| 4,609,171 A * | 9/1986 | Matsui | ................ | H02G 3/32 248/316.1 |
| 5,593,125 A | 1/1997 | Storz et al. | | |
| 5,806,819 A * | 9/1998 | Martone | ................ | F16B 2/22 248/230.1 |
| 6,158,087 A * | 12/2000 | Cheung | ................ | E05D 7/1005 16/374 |
| 6,164,603 A * | 12/2000 | Kawai | ................ | H02G 3/32 24/297 |
| 6,209,827 B1 * | 4/2001 | Kawai | ................ | F16B 21/02 248/74.3 |
| 6,571,429 B2 * | 6/2003 | Yeh | ................ | B65D 23/003 24/16 PB |
| 6,701,573 B1 * | 3/2004 | Ciavarella | ............ | E05D 7/1055 16/268 |
| 6,809,257 B2 | 10/2004 | Shibuya | | |
| 6,923,407 B2 * | 8/2005 | Takeuchi | ................ | F16B 21/02 248/68.1 |
| 7,114,686 B2 * | 10/2006 | Andrigo | ................ | F16B 2/10 248/74.1 |
| 8,844,881 B2 * | 9/2014 | West | ................ | F16L 3/1041 248/69 |
| 9,157,466 B2 * | 10/2015 | Hardy | ................ | F16B 5/0664 |
| 9,416,896 B1 * | 8/2016 | Kato | ................ | F16L 3/222 |
| 2004/0159454 A1 * | 8/2004 | Shibuya | ............ | B60R 16/0215 174/545 |
| 2004/0182973 A1 * | 9/2004 | Kawai | ................ | H02G 3/32 248/74.1 |
| 2004/0188571 A1 * | 9/2004 | Stigler | ............ | B60R 16/0215 248/74.1 |
| 2005/0253025 A1 * | 11/2005 | Benoit | ................ | F16L 3/13 248/74.1 |
| 2007/0018057 A1 * | 1/2007 | Kovac | ................ | F16L 3/237 248/68.1 |
| 2010/0243826 A1 * | 9/2010 | West | ................ | F16L 55/035 248/68.1 |
| 2015/0214709 A1 | 7/2015 | Landry et al. | | |
| 2017/0146154 A1 | 5/2017 | Tally et al. | | |
| 2017/0227141 A1 | 8/2017 | Toll et al. | | |
| 2018/0274699 A1 * | 9/2018 | Ratzlaff | ................ | H02G 3/32 |
| 2019/0226606 A1 * | 7/2019 | Seo | ................ | H02G 3/32 |
| 2020/0158263 A1 | 5/2020 | Kim et al. | | |

OTHER PUBLICATIONS

[No Author Listed] Screw-On U-Clamp Rubber Grommet. Amphenol Pcd. Aug. 12, 2015, 2 pages.

* cited by examiner

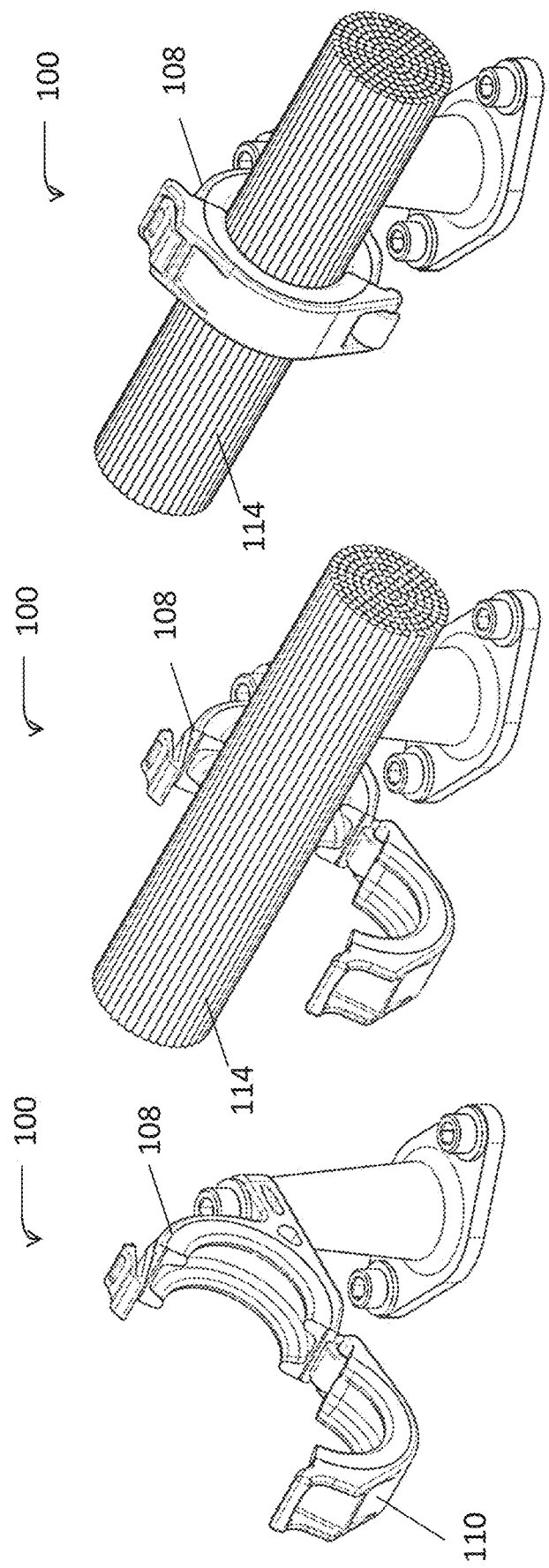

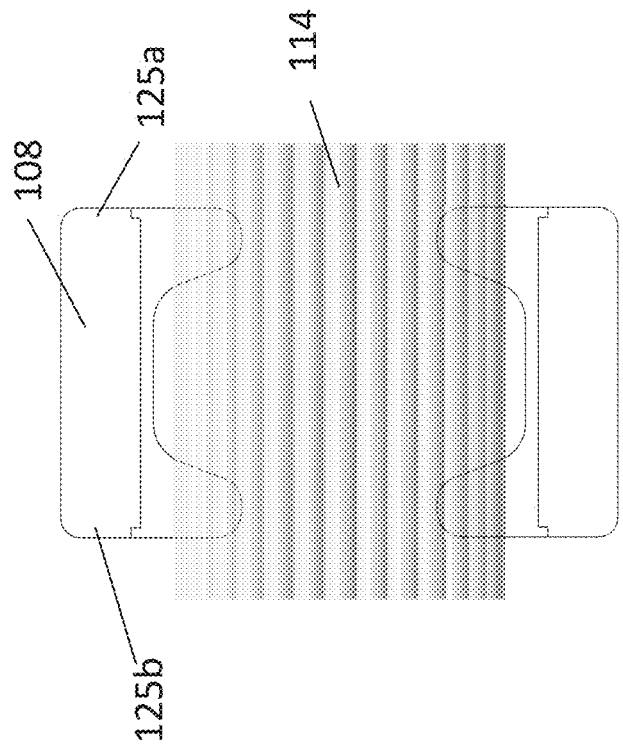
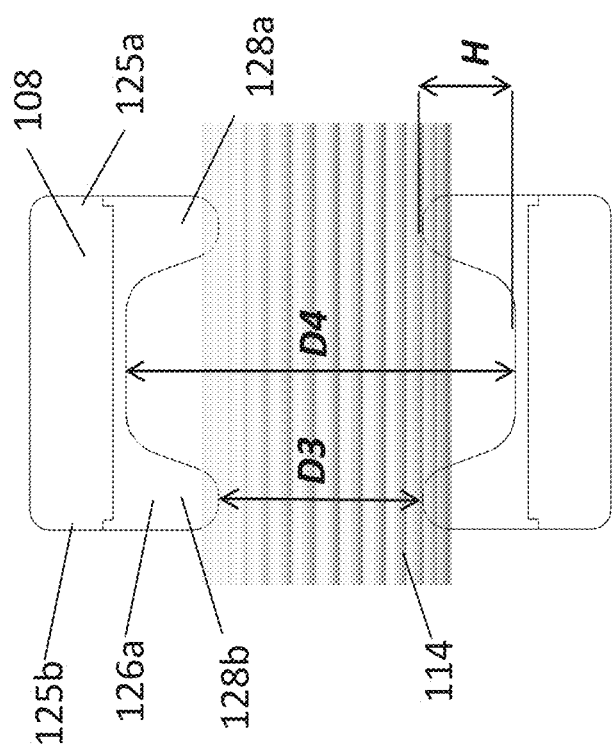
Fig. 24
Fig. 25

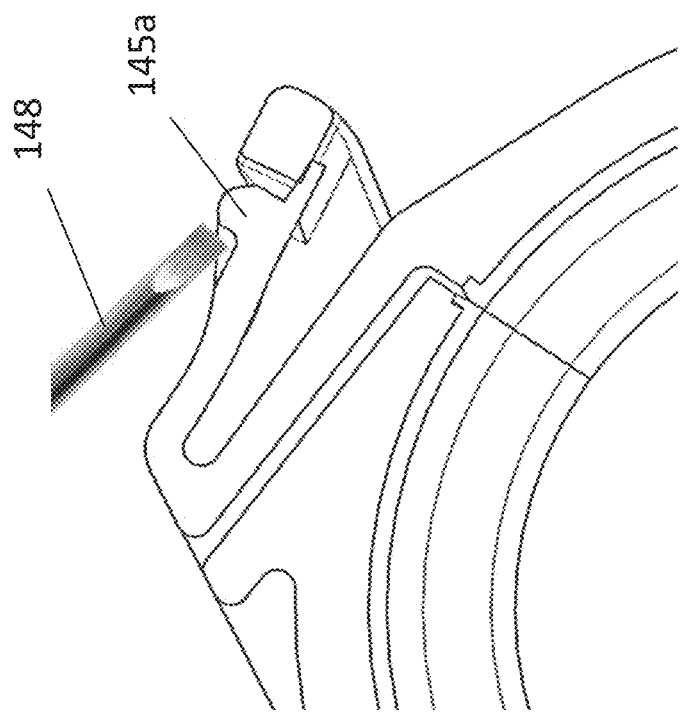
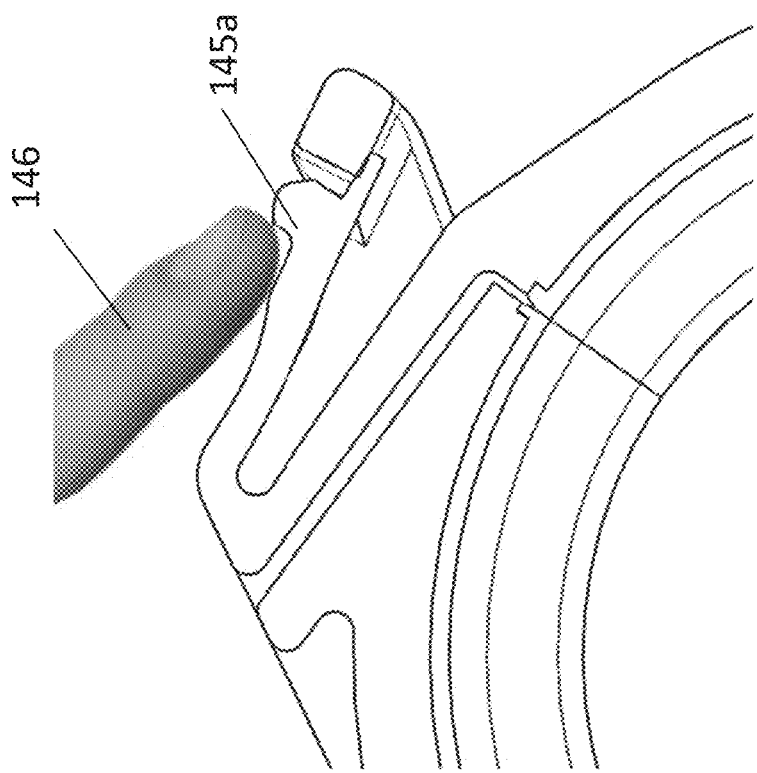

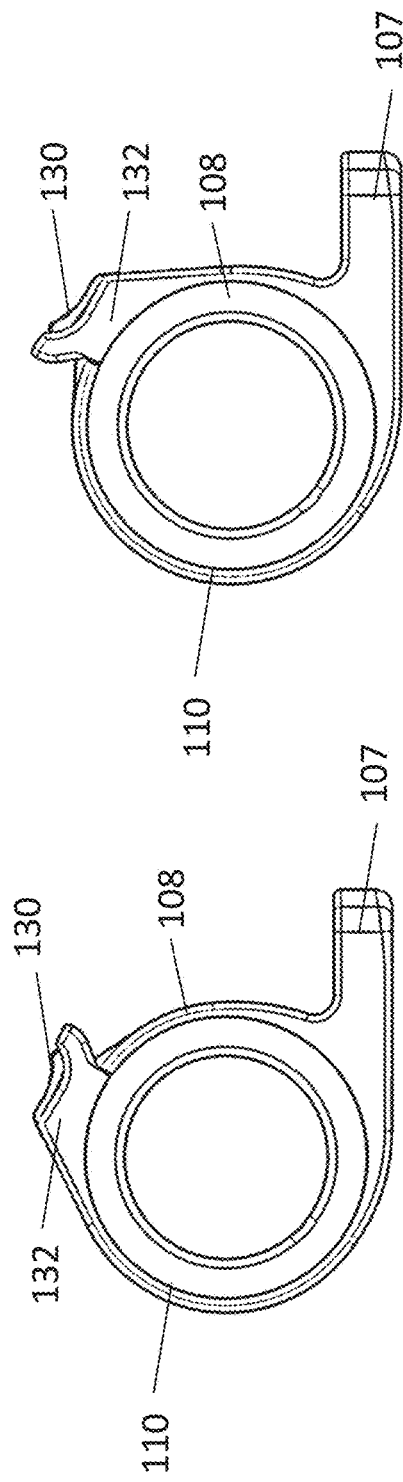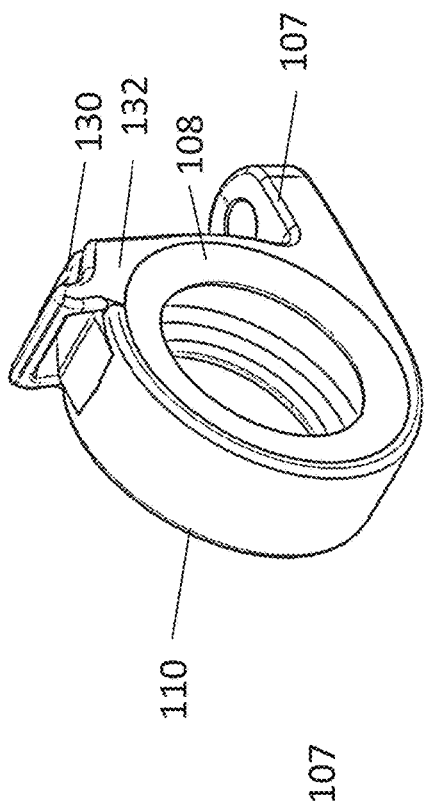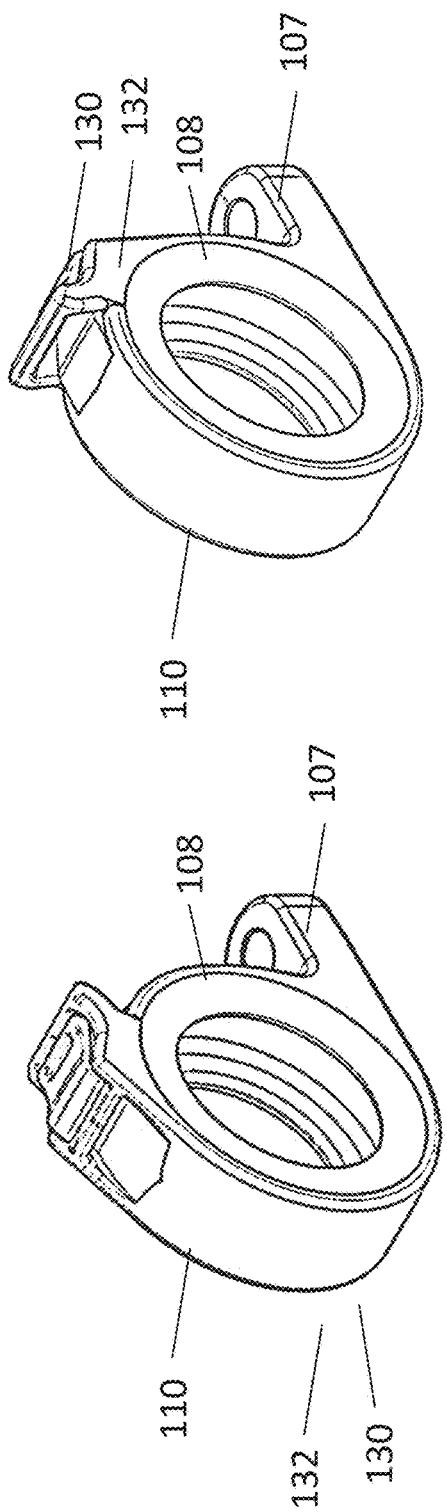

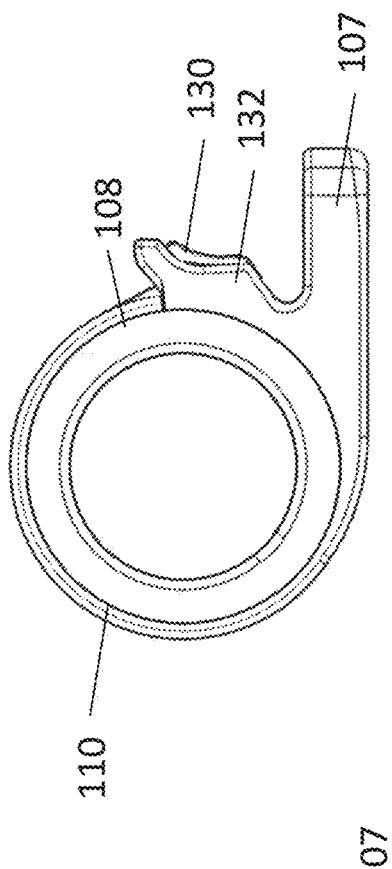
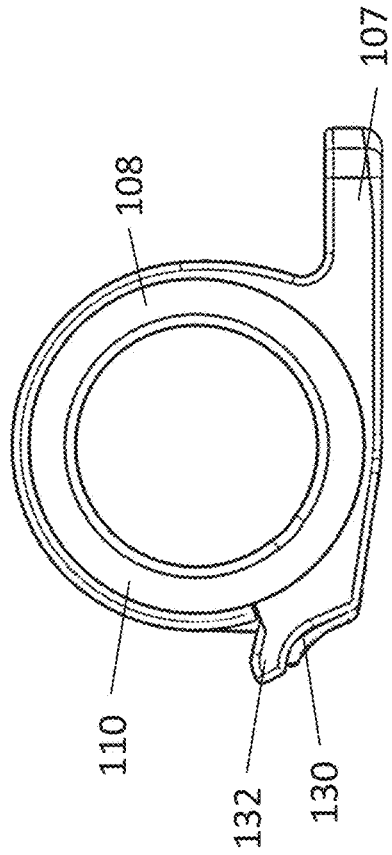
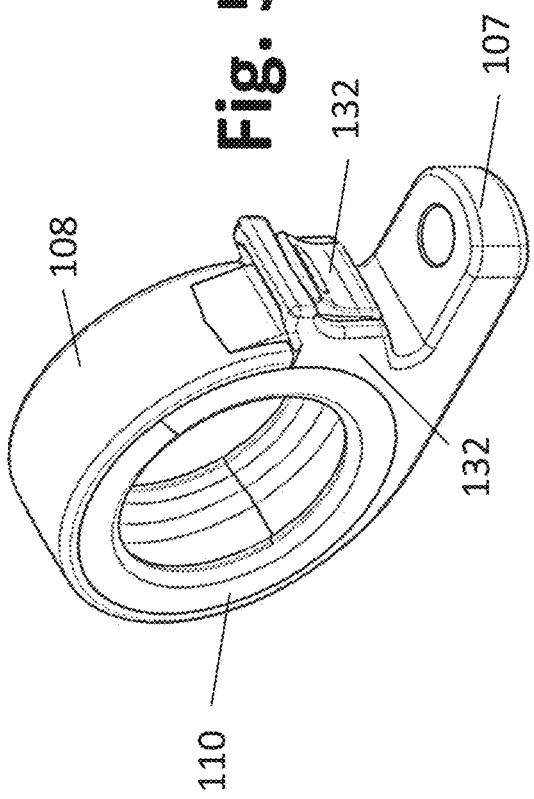
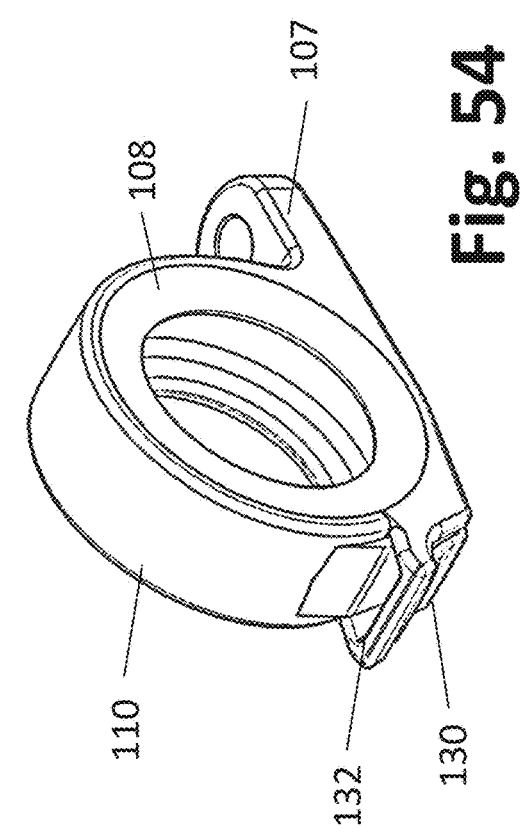

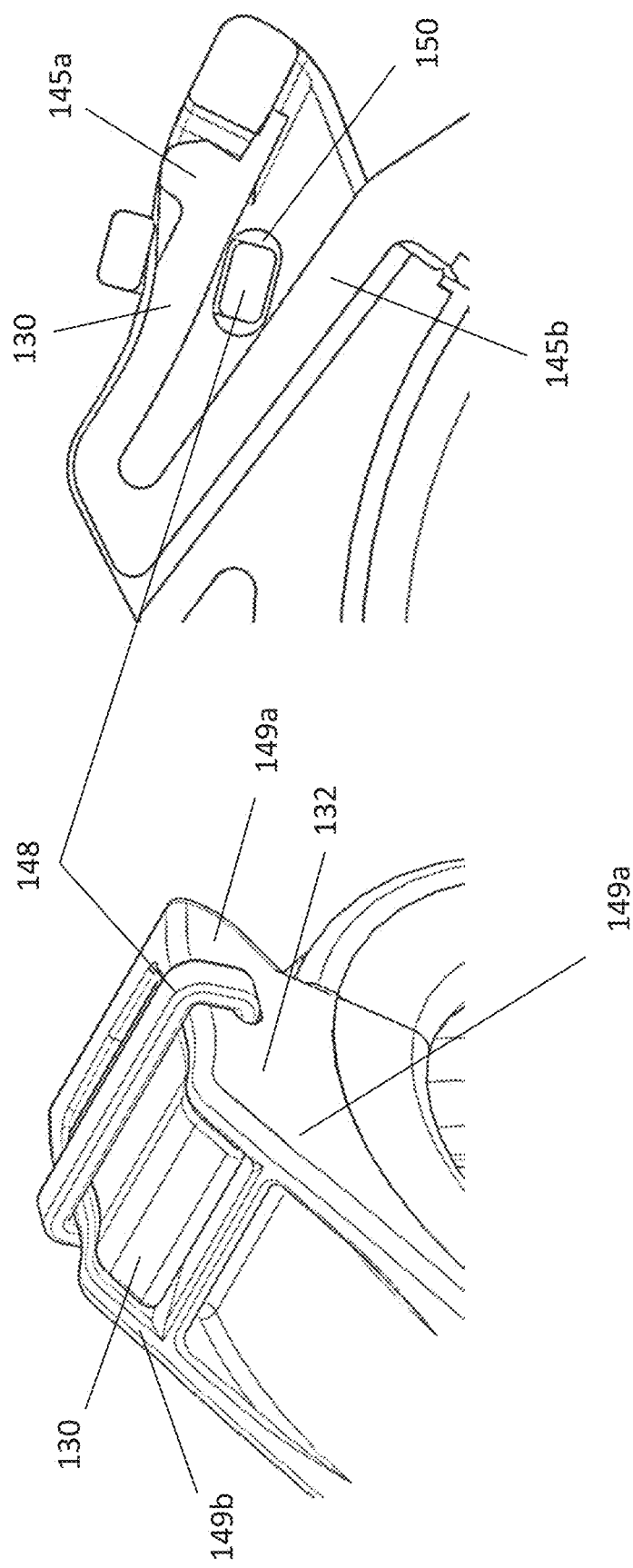

CLAMP ASSEMBLY

CROSS-REFERENCE TO RELATED APPLICATIONS

This application claims priority under 35 U.S.C. § 119(e) to U.S. Provisional Application No. 62/868,840, entitled "CLAMP ASSEMBLY" and filed on Jun. 28, 2019, which is herein incorporated by reference in its entirety.

FIELD

The disclosed embodiments are directed to clamps, such as P-clamps.

BACKGROUND

Clamps, such as P-clamps, are used to secure wires and bundles of wires. Traditionally, P-clamps are formed of metal, with a non-metallic lining. To secure a wire or bundle of wires, an installer bends the clamp around the wire(s), and holds the clamp in the closed position, usually with both hands, while the clamp is secured to a surface. Plastic clamps and clamps with hinges have been developed to replace traditional P-clamps. However, such known clamps do not always provide a satisfactory solution in all aspects.

SUMMARY

According to one embodiment, a clamp includes a first clamp member having a substantially U-shaped clip with first and second arms, and a second clamp member having a housing arranged to receive the clip, the second clamp member cooperating with the first clamp member to define an opening through which a bundle of wires is insertable. A portion of an outwardly facing side of the first arm of the clip is arranged to be exposed when the clip is engaged with the housing.

According to another embodiment, a clamp includes a first clamp member having a substantially U-shaped clip, a second clamp member having a housing arranged to receive the clip, the first and second clamp members cooperating to define an opening through which a bundle of wires is insertable, the second clamp member attached to the first clamp member via a hinge. The hinge includes a hinge pin and a hinge hook, the hinge pin having a diameter that decreases from a first end of the hinge pin towards a central portion of the hinge pin.

According to another embodiment, a clamp includes a first clamp member having a substantially U-shaped clip with first and second arms, a second clamp member having a housing arranged to receive the clip, the first and second clamp members cooperating to define an opening through which a bundle of wires is insertable, and a lock extending around at least a portion of the housing and the first arm of the clip.

According to another embodiment, a method includes attaching a clamp to a support, the clamp having first and second clamp members that cooperate to form an opening arranged to receive a bundle of wires, wherein the first clamp member includes a substantially U-shaped clip having first and second arms and the second clamp member includes a housing arranged to receive the clip, wherein at least a portion of an outwardly-facing side of the first arm is exposed when the clip is engaged with the housing, inserting a bundle of wires into the opening, and closing the clamp.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 3-5 illustrate installation of a bundle of wires in the clamp assembly of FIG. 1, with FIG. 3 showing the P-clamp in an open position, FIG. 4 showing the bundle of wires being inserted into the P-clamp, and FIG. 5 showing the P-clamp in a closed position around the bundle of wires;

FIG. 24 is a cross-sectional side view of a first clamp member of a P-clamp with a small diameter bundle of wires being installed;

FIG. 25 shows the first clamp member of FIG. 24 with a large diameter bundle of wires being installed;

FIGS. 36 and 37 illustrate different types of forces being applied to the clip of FIG. 35, with FIG. 36 showing a force applied by a finger and FIG. 37 showing a force applied by a tool device;

FIG. 49 is a side view of a P-clamp according to some embodiments;

FIG. 50 is a perspective view of the P-clamp of FIG. 49;

FIG. 51 is a side view of a P-clamp according to some embodiments;

FIG. 52 is a perspective view of the P-clamp of FIG. 51;

FIG. 53 is a side view of a P-clamp according to some embodiments;

FIG. 54 is a perspective view of the P-clamp of FIG. 53;

FIG. 55 is a side view of a P-clamp according to some embodiments;

FIG. 56 is a perspective view of the P-clamp of FIG. 55;

FIG. 57 is an enlarged perspective view of a P-clamp with an attached secondary lock; and FIG. 58 is a cross-sectional side view off the P-clamp of FIG. 57.

DETAILED DESCRIPTION

Figure 1:
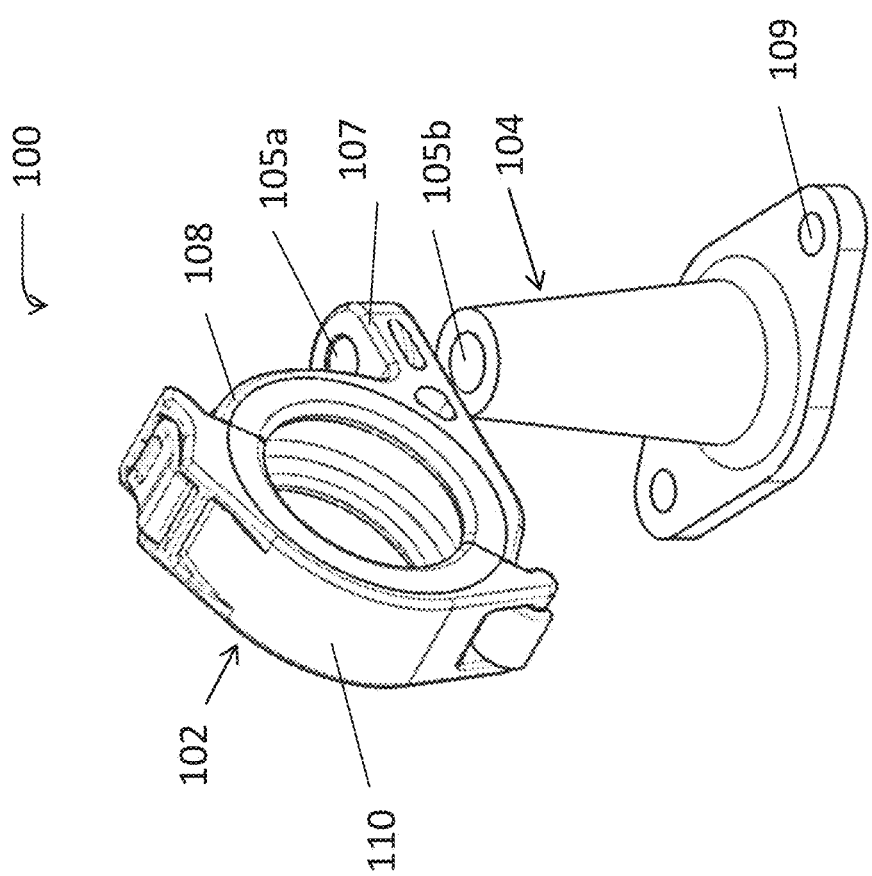
FIG. 1 is a perspective view of a clamp assembly according to embodiments of the present disclosure.

Clamps, such as P-clamps, are used to secure wires and bundles of wires. For example, an array of clamps may be used to secure a bundled length of wire along a surface, such as along a support wall of an airplane. Traditionally, P-clamps are formed of metal, with a non-metallic lining. To secure a wire or bundle of wire, an installer bends the clamp around the wires(s) to form the appropriate shape, and then holds the clamp in the closed position, usually with both hands, to secure the clamp to the surface with a screw or other fastener. Plastic clamps and clamps with hinges have been developed to replace traditional P-clamps. However, such known clamps do not always provide a satisfactory solution in all aspects.

The inventors have recognized that advantages may be realized by providing a P-clamp that may be pre-mounted to a support. For example, in some embodiments, during installation, an installer may attach one or more supports to a surface, such as along a wall where a length of wire is to be installed. Next, the installer may attach a P-clamp to each of the supports. Finally, the installer may insert and secure the length of wire into each of the P-clamps along the wall.

The inventors have also recognized that advantages may be realized if the same P-clamp were able to accommodate a range of wire bundle diameters. For example, during an installation, the installer may pre-mount the same P-clamp along the entire surface receiving the length of wire, and thereafter install the wire(s) in the clamps.

The inventors have also recognized that advantages may be realized by having a P-clamp that may be opened or closed without using a tool device. For example, advantages may be realized if the P-clamp may be opened and closed by hand during installation. As will be appreciated, some known P-clamps may be closed via a fastener, such as a screw, or via a ratchet mechanism. In such examples, the installer uses a tool, such as a screwdriver, to unscrew the fastener or disengage the ratchet mechanism, to open the P-clamp. This may require additional time for installation or repair, such as if the installer needs to relocate wire(s) from one P-clamp to another, to replace a wire, and/or to replace a P-clamp. The inventors have recognized that advantages may be realized by having a P-clamp with a snap-in mechanism with a clip and a corresponding housing that an installer may engage or disengage by hand.

The inventors have also recognized that advantages may be realized by having a P-clamp with a housing configured to prevent inadvertent disengagement of the P-clamp and/or to prevent inadvertent over deflection of the clip. In some embodiments, when the clip is engaged with the housing, at least a portion of the clip may be exposed. For example, in some embodiments, a portion of an arm of a U-shaped clip and/or a distal end of the clip may be exposed. In such embodiments, advantage may be realized if the housing includes a protective wall that may prevent a tool or foreign object debris ("FOD") from being lodged between the clip and housing, which may cause the clip to disengage from the housing.

The inventors have also recognized that advantages may be realized if the P-clamp includes a secondary lock (e.g., a tie strap, locking wire, and/or cable). In some embodiments, such a secondary lock may provide redundancy in securing the wire(s) in the P-clamp. For example, the secondary lock may hold the P-clamp in a closed position if the clip inadvertently disengaged or was broken.

Finally, the inventors have recognized that advantages may be realized if the P-clamp included a hinge with a geometry arranged to provide an optimized pivot point for clamp opening and closing. For example, in some embodiments, the hinge may allow for an evenly balanced strength between a hinge hook and a hinge pin.

Aspects of the present disclosure include a clamp assembly having a P-clamp and a support structure, such as a stand or support, to which the P-clamp may be mounted prior to installing a wire bundle or other longitudinal member in the clamp. In some embodiments, the P-clamp includes first and second clamp members that cooperate to form an opening through which the bundle of wires extends. In some embodiments, the first clamp member may be fixedly attachable to the support and the second clamp member may be moveable relative to the first clamp member to open and close the P-clamp.

In some embodiments, the P-clamp includes a snap-in closure mechanism for securing the first and second clamp members to one another. For example, in some embodiments, the clamp includes a clip on one of the clamp members that engages with a corresponding housing of the other clamp member. In some embodiments, the clip is substantially U-shaped. In some embodiments, a first side or arm of the U includes one or more engagement surfaces that engage with one or more contact surfaces on the corresponding housing. In some embodiments, the clip is received in a channel formed in the housing.

In some embodiments, to engage the clip with the housing, the user may press on the first arm of the U-shaped clip to move the first and second arms closer together so that the clip may be moved below the contact surfaces of the housing and into the channel. Once seated in the channel, the first arm may move (e.g., snap) in an upward direction to engage with the housing. In some embodiments, when the clip is seated in the channel, at least a portion of the first arm is exposed. For example, at least a portion of the outwardly facing side of the first arm may be exposed. In some embodiments, the distal end of the clip also may be exposed.

In some embodiments, to disengage the clip form the housing, the user may again press on the first arm of the U-shaped clip to move the first and second arms together so that the clip may be moved below the contact surfaces and out of the housing. As will be appreciated, although the P-clamp is described as being openable by hand, the P-clamp also maybe opened with a tool device in some embodiments.

In some embodiments, the housing may include a protective wall to prevent inadvertent disengagement and/or prevent deflection of the clip when the clip is under a load. In some embodiments, the protective wall may be located below the second arm of the U-shaped clip. In some embodiments, the protective wall may be formed by the bottom or floor of the channel into which the clip is received. One or more of the sides of the housing also may act as protective walls in some embodiments. In some embodiments, the protective wall may at least partially define a cavity in the housing of the second clamp member, the cavity being formed below the second arm of the U-shaped clip. In some embodiments, the cavity may be arranged to trap stray debris and/or a tool device such that the debris and/or tool device does not contact the clip and cause inadvertent disengagement or damage to the clip. The cavity also may be arranged to assist with closing the clamp.

In some embodiments, the P-clamp is arranged to accommodate wires or bundles of wires having different diameters. For example, the P-clamp may include a thermoplastic clamp with an overmolded cushion arranged to accommodate a variety of diameters. For example, the cushion may include one or more lobes that may accommodate a range of diameters for the same clamp, as will be described. The cushion also may be bonded to the clamp in some embodiments, such as via an adhesive. In other embodiments, the P-clamp may include a removable cushion, such as a removable grommet. In such embodiments, the grommet may be formed in different sizes to accommodate different sized diameters, with the installer choosing the desired grommet size during installation. As will be appreciated, the installer may insert the grommet into the P-clamp before or after the P-clamp is mounted to the support. The grommet also may include one or more lobes like the overmolded cushion.

In some embodiments, the cushion may be arranged to reduce a possibility of having one or more wires pinched between one or more cushion sections while closing the clamp around the wire bundle. For example, in some embodiments, at least a portion of the cushions may overlap one another to substantially maintain the wire in the circular opening formed between the cushion and minimize the possibility of pinching.

FIG. 1 illustrates a clamp assembly 100 according to embodiments of the present disclosure. As shown in this figure, the assembly includes a clamp, such as P-clamp 102, and a support 104, such as a stand, to which the P-clamp is attachable. In some embodiments, as shown in FIG. 1, the P-clamp includes first and second clamp members 108, 110. In some embodiments, as will be described, the first and second clamp members may be moveably attached to another.

Figure 2:
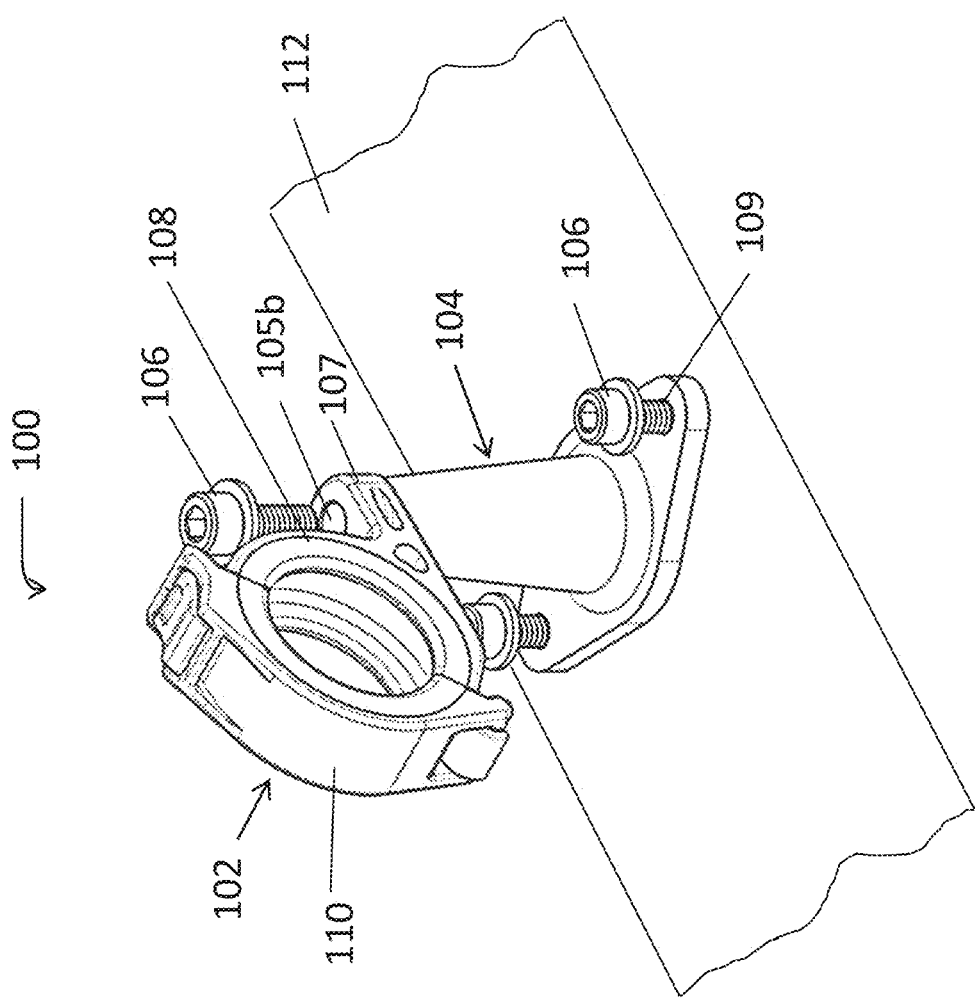
FIG. 2 illustrates a P-clamp of the clamp assembly of FIG. 1 being attached to a support of the clamp assembly of FIG. 1.

As shown in FIG. 2, which illustrates mounting of the P-clamp prior to installation of the wire(s), the P-clamp 102 may be attached to the support 104 via a fastener 106, such as a bolt or screw. As will be appreciated, the P-clamp may be attached to the support via other suitable fasteners in other embodiments. In some embodiments, the P-clamp may be fixedly attached to the support, although, in other embodiments, the P-clamp may be rotatably attached to the support.

In some embodiments, the P-clamp 102 and support 104 may have corresponding openings 105a, 105b through which the fastener is inserted to attach the P-clamp to the support (see FIG. 1). In some embodiments, the openings 105a, 105b are aligned with one another so that the fastener may be inserted into the openings to secure the P-clamp to the support. In such embodiments, the openings may have the same cross-sectional shape.

In some embodiments, the opening 105b in the P-clamp is formed in a mounting flange 107. In some embodiments, as shown in FIGS. 1 and 2, the mounting flange may be attachable to the first clamp member 108 of the P-clamp. For example, the mounting flange may be fixedly attached to the first clamp member. In other embodiments, the mounting flange may be integrally formed with the first clamp member 108. As will be appreciated, the mounting flange also may be attachable to the second clamp member in other embodiments.

In some embodiments, the support 104 includes one or more openings 109 through which fasteners 106 may be passed to attach the support to a surface 112, such as a wall (see, e.g., FIG. 2). As shown in FIGS. 3-5, once the P-clamp has been attached to the support, a bundle of wires 114 may be installed in the P-clamp. For example, as shown in FIG. 3, the P-clamp may be opened by moving the second clamp member 110 away from the first clamp member 108. An installer may then insert the bundle of wires 114 into the opening of the first clamp member and may close the P-clamp. In some embodiments, to close the P-clamp, the second clamp member 110 may be moved towards the first clamp member 108, with the first and second clamp members 108, 110 being secured to one another to hold the bundle of wires in the P-clamp.

Figure 6:
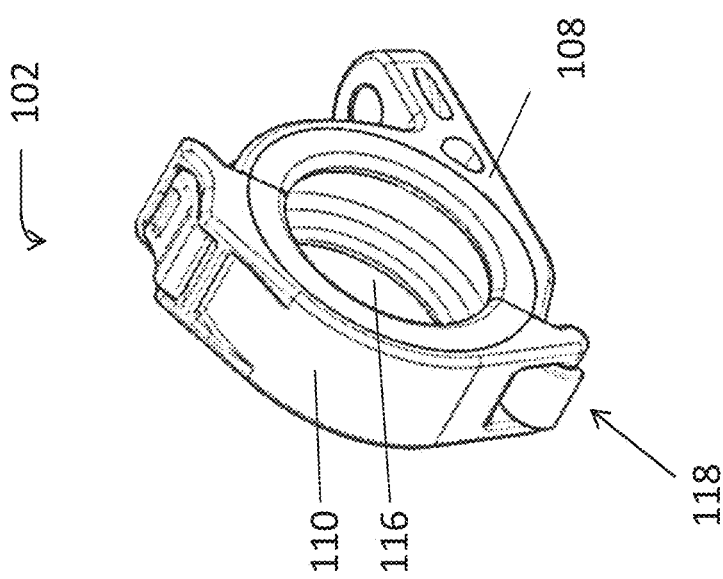
FIG. 6 is a P-clamp according to embodiments of the present disclosure.

As shown in FIG. 6, the first and second clamp members 108, 110 cooperate with one another to form an opening 116 through which the bundle of wires 114 may be extended. In some embodiments, the opening has a circular cross-sectional shape (see FIG. 8). As will be appreciated, although the opening is shown as having a circular cross-sectional shape, the opening may have other suitable shapes in other embodiments. For example, the opening may be square, triangular, rectangular, oval, or another suitable shape.

Figure 7:
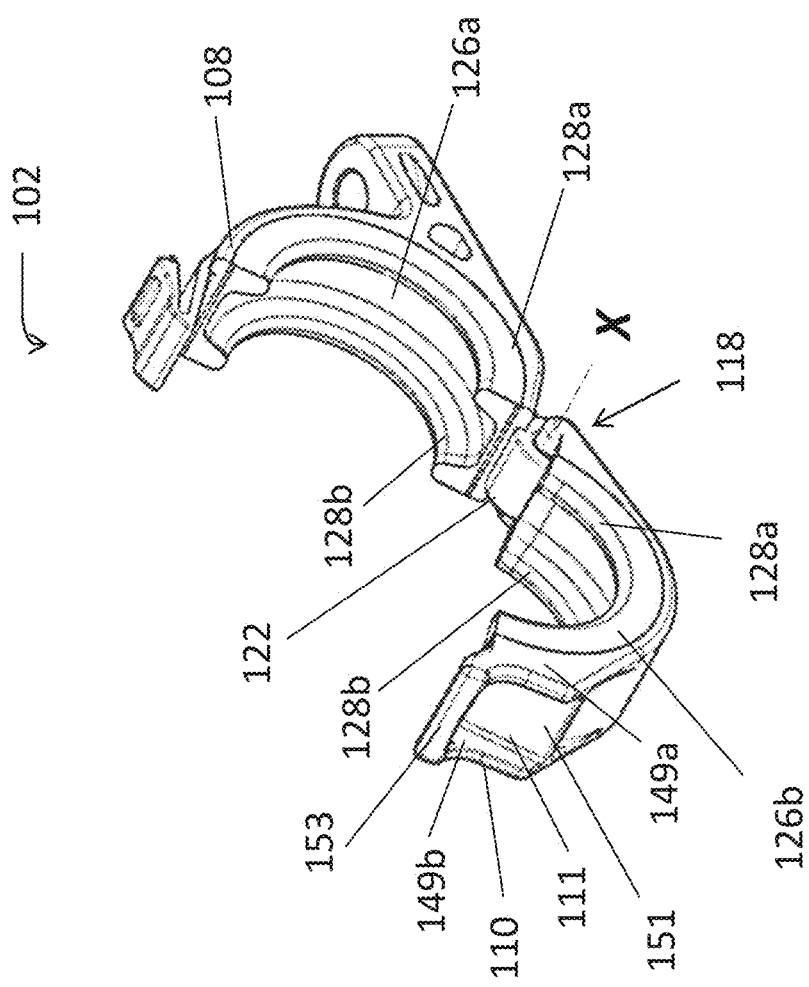
FIG. 7 shows the P-clamp of FIG. 6 in an open position.
Figure 9:
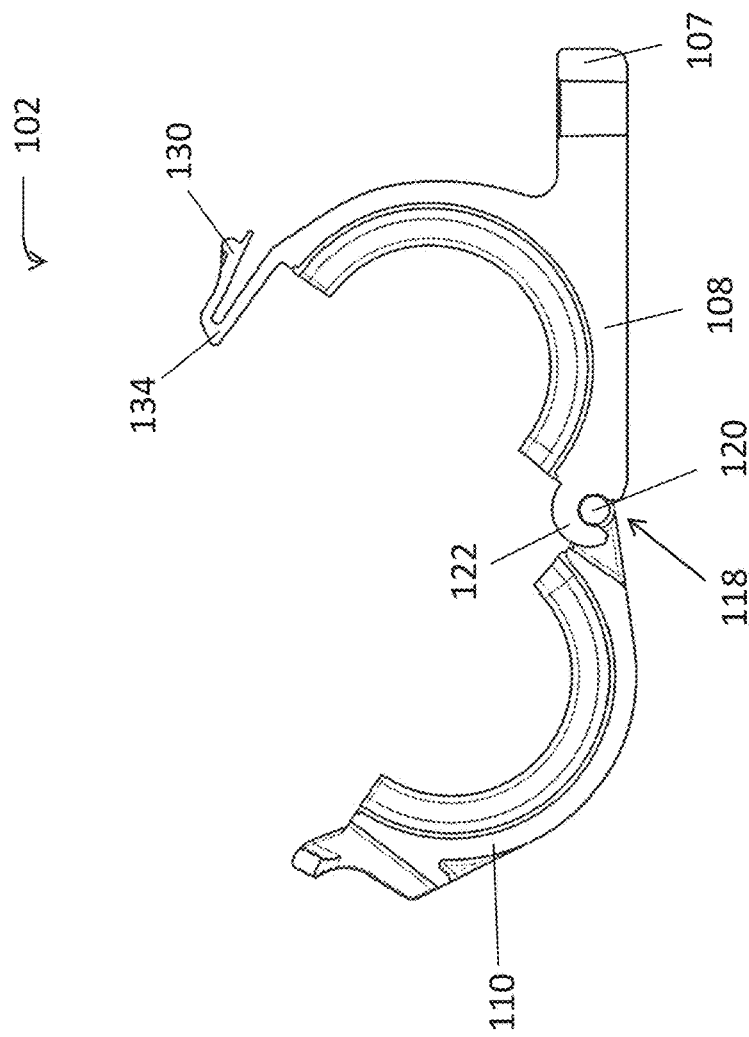
FIG. 9 is a side view of the P-clamp of FIG. 7.
Figure 8:
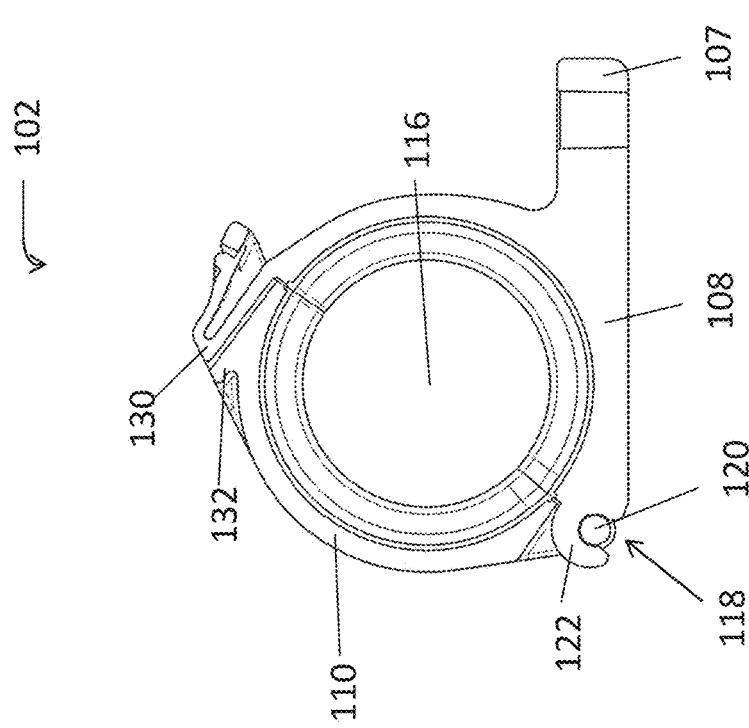
FIG. 8 is a side view of the P-clamp of FIG. 6.

In some embodiments, as shown in FIGS. 7-9, each of the first and second clamp members may be arcuate in shape. In some embodiments, the first and second clamp members may each form half of the circular opening. In such embodiments, the arc length of the inner surface of each of the first and second clamp member may be the same. As will be appreciated, the first and second clamp members need not be the same the size. For example, the arc length of the first and second clamp members may be different in some embodiments. In some embodiments, the arc length of the first clamp member may be longer (e.g., two times longer) than the arc length of the second clamp member.

In some embodiments, the first and second clamp members may be moveable relative to one another. In some embodiments, as shown in FIGS. 6-20, the first and second clamp members 108, 110, may be hingedly attached to one another, such as via hinge 118. In some embodiments, as shown in FIG. 7, the first and second clamp members may pivot relative to the hinge 118. For example, as shown in FIG. 7, each of the first and second clamp members 108, 110 may pivot about a pivot axis X. In some embodiments, the pivot axis may be substantially parallel to a direction of a longitudinal axis of a hinge pin 120 of the hinge.

In some embodiments, the hinge may include the hinge pin 120 and a hinge hook 122 (see, e.g., FIGS. 8-11, 13-14, and 16-17). In such embodiments, the hinge hook 122 may be attached to the hinge pin 120 to attach the first clamp member 108 to the second clamp member 110. For example, in some embodiments, the hinge may have a snap-fit arrangement, with the hinge hook being snapped onto the hinge pin to attach the first and second clamp members together.

In some embodiments, as shown in FIG. 9, the hinge pin 120 may be attached to the second clamp member. For example, the hinge pin may be fixedly attached to or may be integrally formed with the second clamp member 110. In such embodiments, the hinge hook may be attached to the first clamp member. For example, the hinge hook 122 may be fixedly attached to or may be integrally formed with the first clamp member 108. As will be appreciated, in other embodiments, the hinge hook may be attached to the second clamp member and the hinge pin may be attached to the first clamp member.

Figure 11:
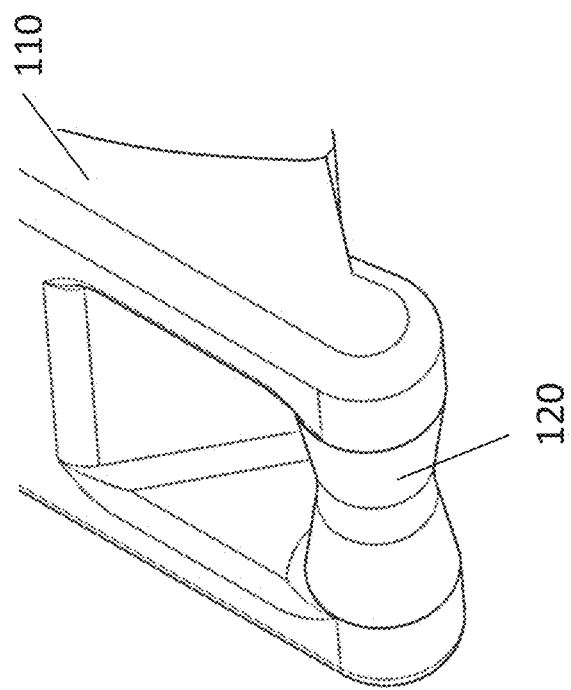
FIG. 11 is an enlarged view of a hinge pin according to some embodiments.
Figure 12:
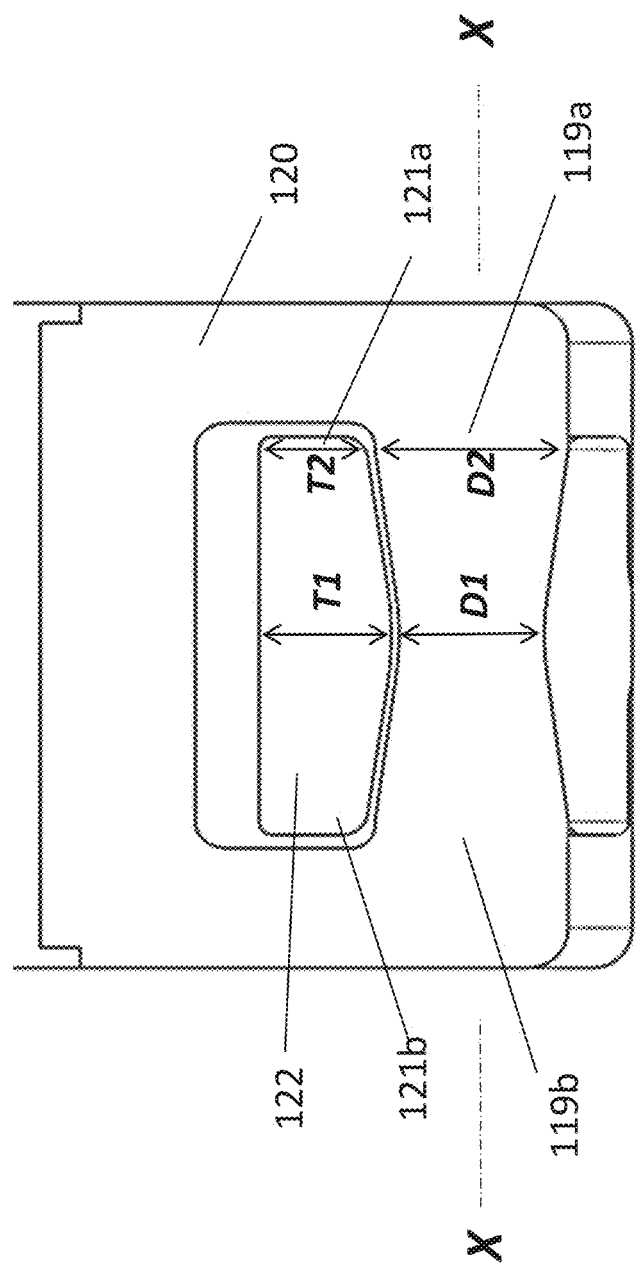
FIG. 12 shows the hinge hook of FIG. 10 attached to the hinge pin of FIG. 11.

In some embodiments, the hinge hook and the hinge pin may have corresponding geometries. For example, a shape and size of the hinge hook may correspond to a shape and size of the hinge pin. In some embodiments, as shown in FIGS. 11 and 12, a diameter of the hinge pin 120 may decrease in a direction towards a central region of the hinge pin. In such an example, as shown in FIG. 12, a diameter D2 at or near a first end 119a of the hinge pin may be larger than a diameter D1 of a central region of the hinge pin. As shown these views, the diameter of the hinge pin may be smallest in the central region of the hinge pin. In some embodiments, the diameter of the hinge pin may be smallest at a point equidistant between the first and second ends 119a, 119b of the hinge pin.

In some embodiments, the hinge pin may be symmetric about the central region such that the diameter of the first and second ends of the hinge pin is the same. The diameter of the hinge pin also may be symmetric about the longitudinal axis of the hinge pin. In some embodiments, as shown in FIG. 12, the diameter of the hinge pin may be tapered in a direction towards the central region of the hinge pin. In some embodiments, the diameter may taper gradually from the first or second end of the hinge pin to the central region. In other embodiments, the diameter may decrease in a stepped fashion between the first and second ends and the central region.

Figure 10:
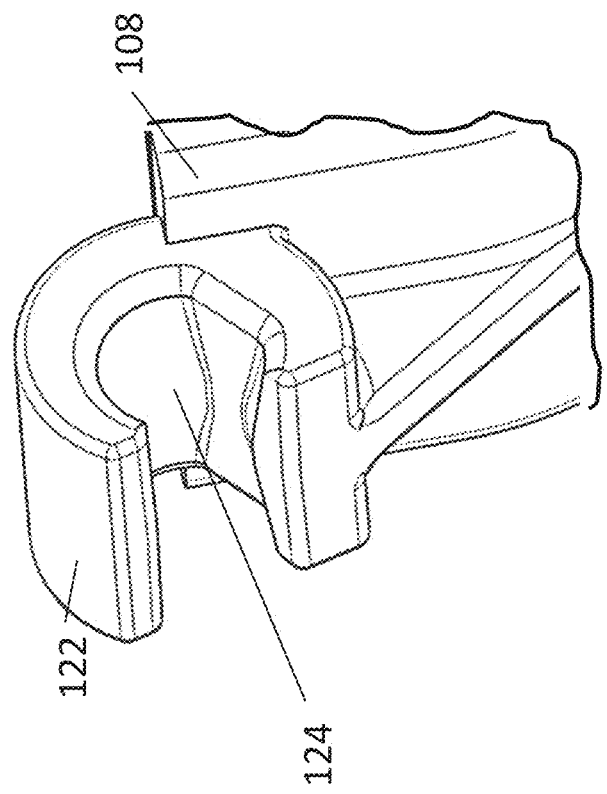
FIG. 10 is an enlarged view of a hinge hook according to some embodiments.

As shown in FIGS. 10 and 12, the shape and size of the hinge hook 122 may correspond to the shape and size of the hinge pin 120. For example, as shown in FIG. 10, the hinge hook 122 may include a channel 124 arranged to receive the hinge pin 120. In such an example, as shown in FIG. 10, the diameter of the channel may decrease towards a central region of the channel, similar to that of the hinge pin. For example, the channel may have a diameter that tapers towards the central region of the channel. In such embodiments, as shown in FIG. 12, a thickness T1 of the hinge hook 122 may increase towards a central region of the hinge hook. For purposes herein, the thickness of the hinge hook may be equal to a difference between an inner diameter of the hinge hook (e.g., a diameter of an inner surface forming the channel into which the hinge pin is received) and the outer dimeter of the hinge hook). In some embodiments, the thickness of the hinge hook may be smallest at or near the ends 121a, 121b of the hinge hook (see the thickness labeled T2 in FIG. 12). Similar to the hinge pin, the hinge hook may have a thickness that is symmetric about the central region of the hinge pin, with the thickness at or near the first and second ends 121a, 121b of the hinge hook being the same.

In some embodiments, the thickness of the hinge hook may be larger (see T1 in FIG. 12) at or near a central region and the hinge pin may include a larger diameter D2 at or near the first and second ends. In some embodiments, such an arrangement may provide strength in possible critical areas of the hinge. In some embodiments, this may allow for evenly balanced strength between the hinge hook and the hinge pin. In some embodiments, this may provide an optimized pivot point for opening and closing the clamp.

Although the hinge pin is shown as having a diameter that decreases towards the central region of the hinge pin, in other embodiments, the diameter of the hinge pin may increase towards the central region. In such embodiments, the diameter of the central region of the hinge pin may be greater than the diameter of the rest of the hinge pin. In some embodiments, the diameter of the hinge pin may be largest at or near the central region of the hinge pin, with the thickness of the hinge hook being smallest at or near the central region.

Figure 14:
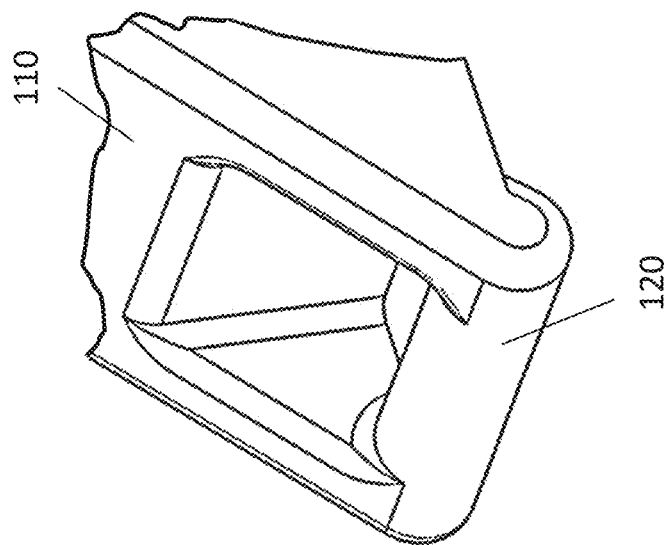
FIG. 14 is an enlarged view of a hinge pin according to some embodiments.
Figure 13:
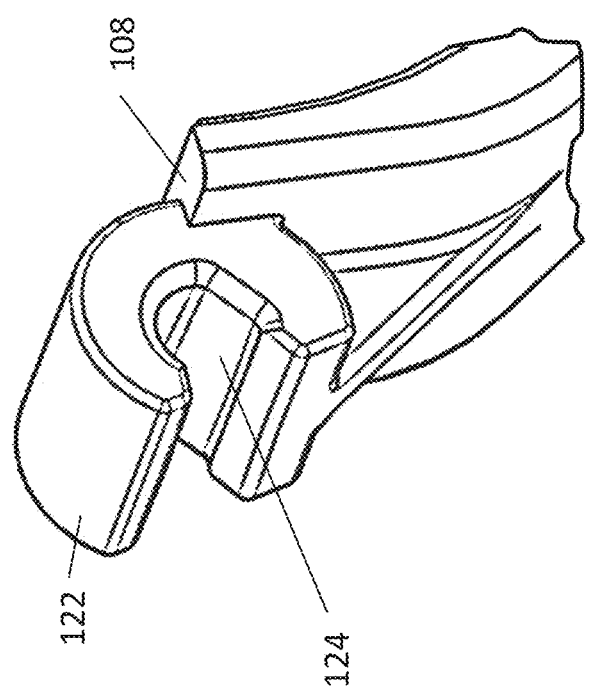
FIG. 13 is an enlarged view of a hinge hook according to some embodiments.
Figure 15:
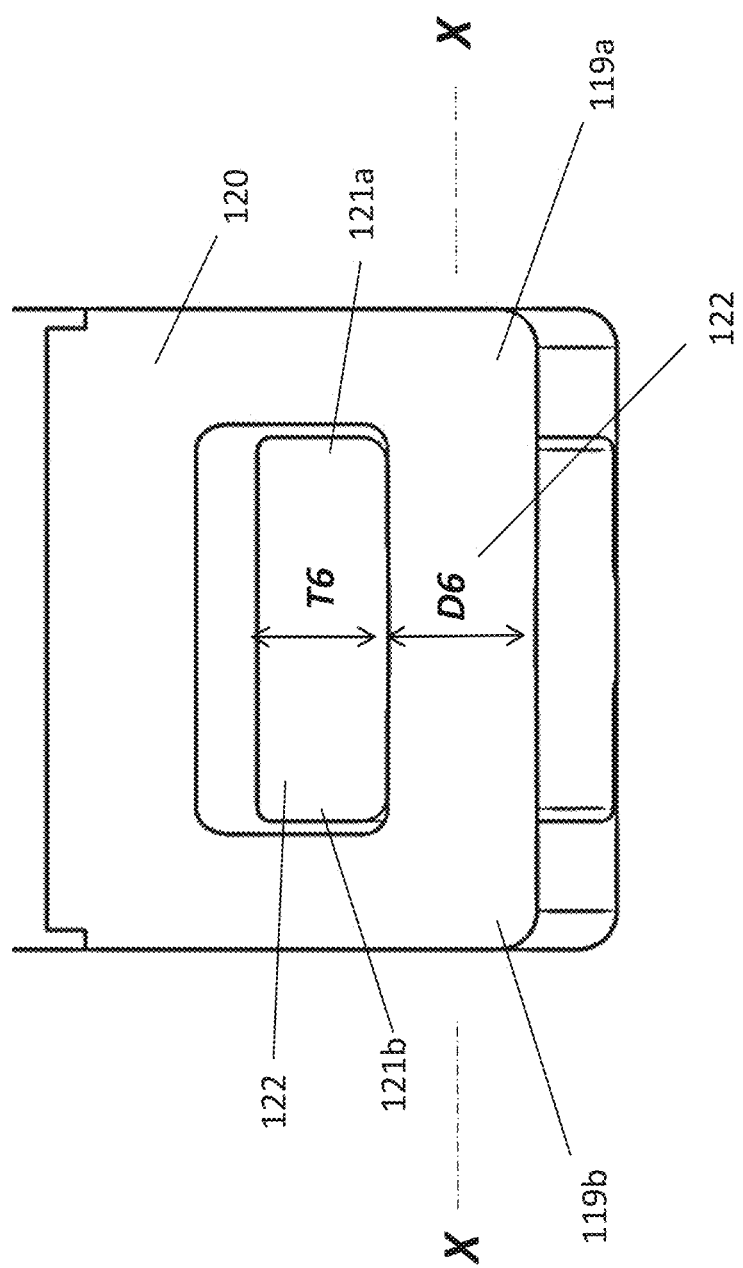
FIG. 15 shows the hinge hook of FIG. 13 attached to the hinge pin of FIG. 14.

In some embodiments, as shown in FIGS. 13-15, a diameter D6 of the hinge pin may be uniform between the first and second ends 119a, 119b of the hinge pin 122. In such embodiments, the hinge hook may have a channel 124 (see FIG. 13) with a uniform diameter. The thickness T6 of the hinge hook also may be uniform between the first and second ends 121a, 121b of the hinge hook in such embodiments.

Figure 17:
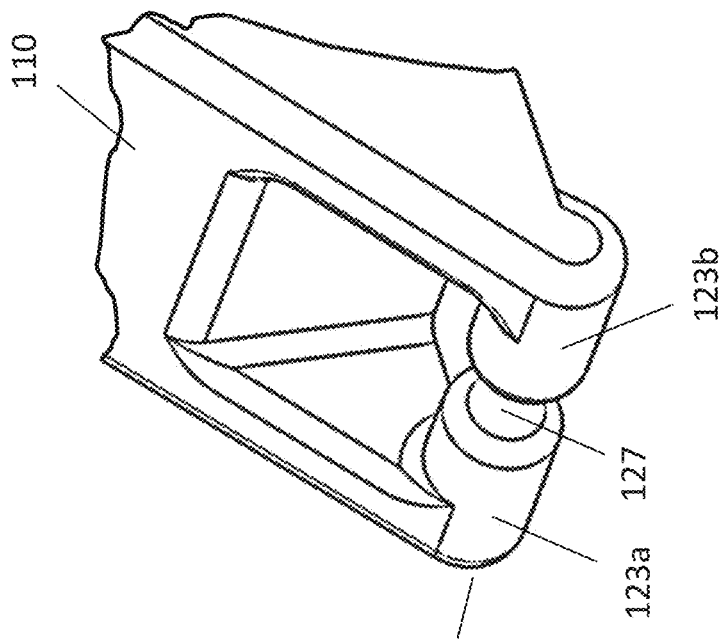
FIG. 17 is an enlarged view of a hinge pin of the hinge of FIG. 16.

In another embodiments, as shown in FIG. 17 the hinge pin may include first and second hinge pin segments 123a, 123b, the first and second hinge pin segments being separated from one another by a gap 127. As shown in this view, the first and second hinge pins segments 123a, 123b may be the same diameter and may be horizontally aligned. In other embodiments, the first and second hinge pin segments may be different diameters or may be vertically offset from one another. Similar to the above, one or both of the first and second hinge pin segments may have a diameter that tapers towards a central region of the hinge pin (e.g., the gap). As will be appreciated, although the hinge pin is shown as having two hinge pin segments in this embodiment, the hinge pin may have more than two segments in other embodiments.

Figure 16:
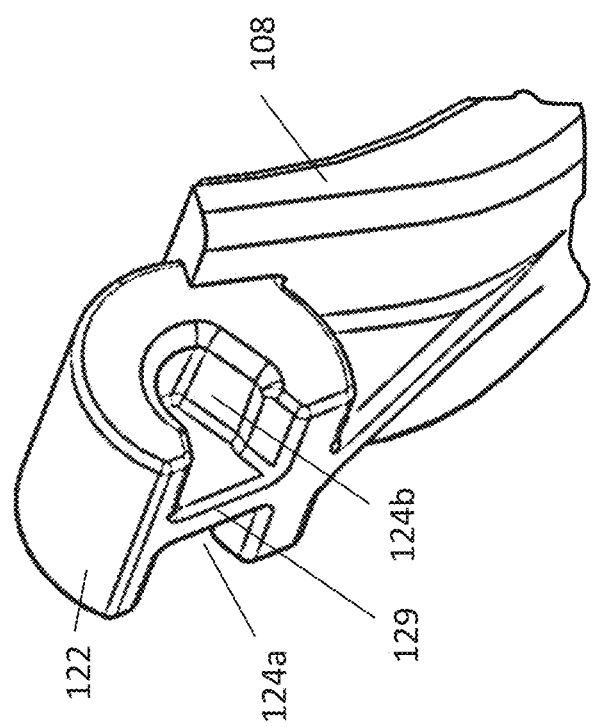
FIG. 16 is an enlarged view of a hinge hook of a hinge according to some embodiments.

In some embodiments, as shown in FIG. 16, the hinge hook may have first and second channels 124a, 124b for receiving the corresponding hinge pin segments 123a, 123b, the channels being separated by a divider 129. In some embodiments, as shown in this view, the diameter of each channel may be the same, and the channels may be horizontally aligned. As will be appreciated, the shape and size of the channels may vary depending upon the shape and size of the corresponding hinge pin segments. In a similar manner, the shape and size of the divider may vary depending on the shape of the corresponding gap between the hinge pin segments. In some embodiments, the divider may be substantially rectangular in shape, although the divider may have other suitable shapes.

Although the shape and size of the hinge hook is shown as being the same as that of the hinge pin, it will be appreciated that the shape and size of the hinge hook may vary from that of the hinge pin. For example, the length of the hinge hook may be smaller than the length of the hinge pin in some embodiments. The hinge hook also may be longer than the hinge pin in other embodiments.

Figure 18:
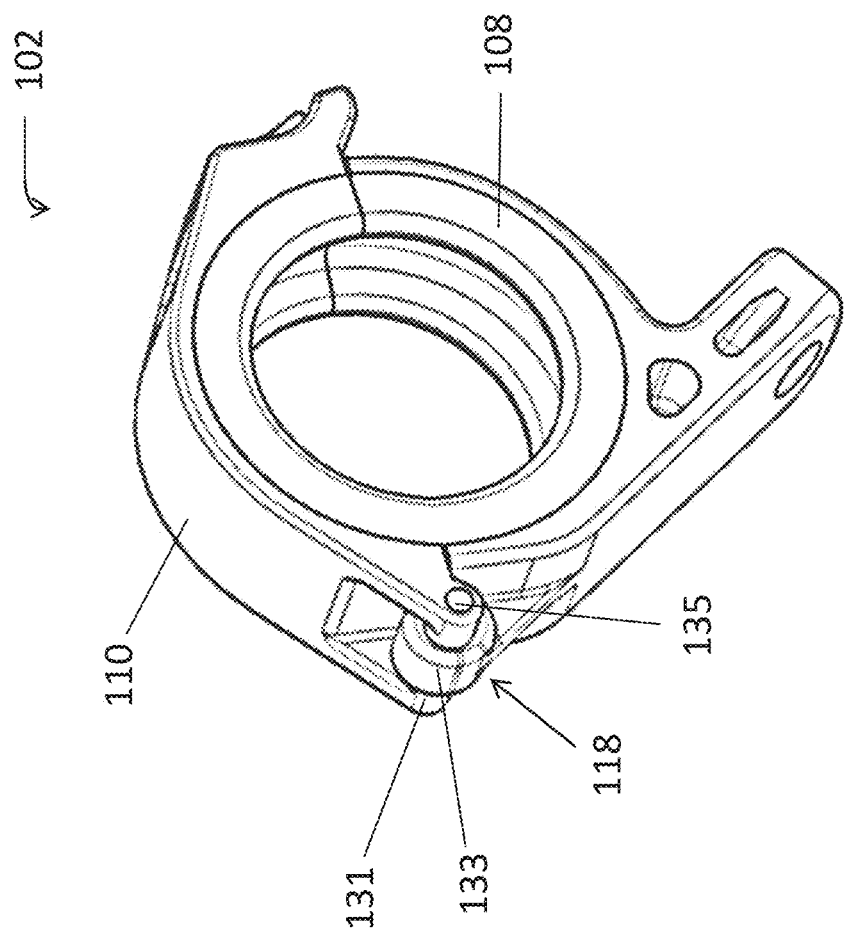
FIG. 18 is a perspective view of a P-clamp according to some embodiments.
Figure 20:
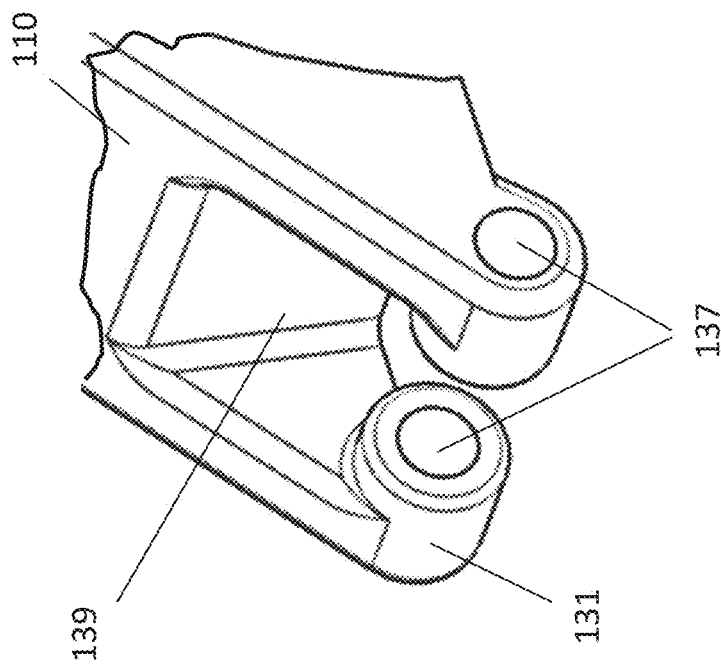
FIGS. 19 and 20 illustrate a tang (FIG. 19) and corresponding clevis (FIG. 20) of a clevis fastener of a hinge of the P-clamp of FIG. 18.
Figure 19:
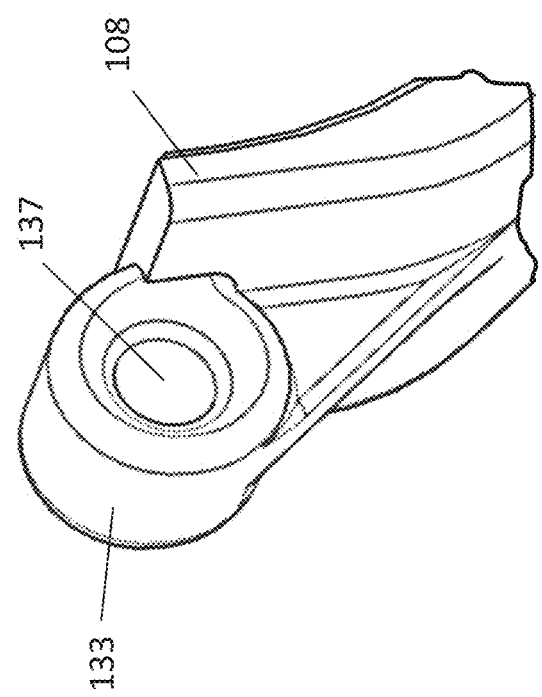

Although the first and second clamp members are shown as being attached to one another via a hinge pin and hinge hook, the hinge may have other suitable arrangements in other embodiments. For example, as shown in FIGS. 18-20, the hinge 118 may include a clevis fastener, with a clevis 131, a tang 133, and a pin 135 (see FIG. 18). In some embodiments, the clevis may include a channel 139 into which the tang is received.

In such embodiments, the tang and clevis each may include corresponding openings 137 through which the pin is inserted to secure the clevis to the tang and, in turn, the first and second clamp members. As shown in FIGS. 18-20, in some embodiments, the clevis may be attached to the first clamp member and the tang may be attached to the second clamp member. As will be appreciated, in other embodiments, the clevis may be attached to the first clamp member with the tang being attached to the second clamp member.

Figure 21:
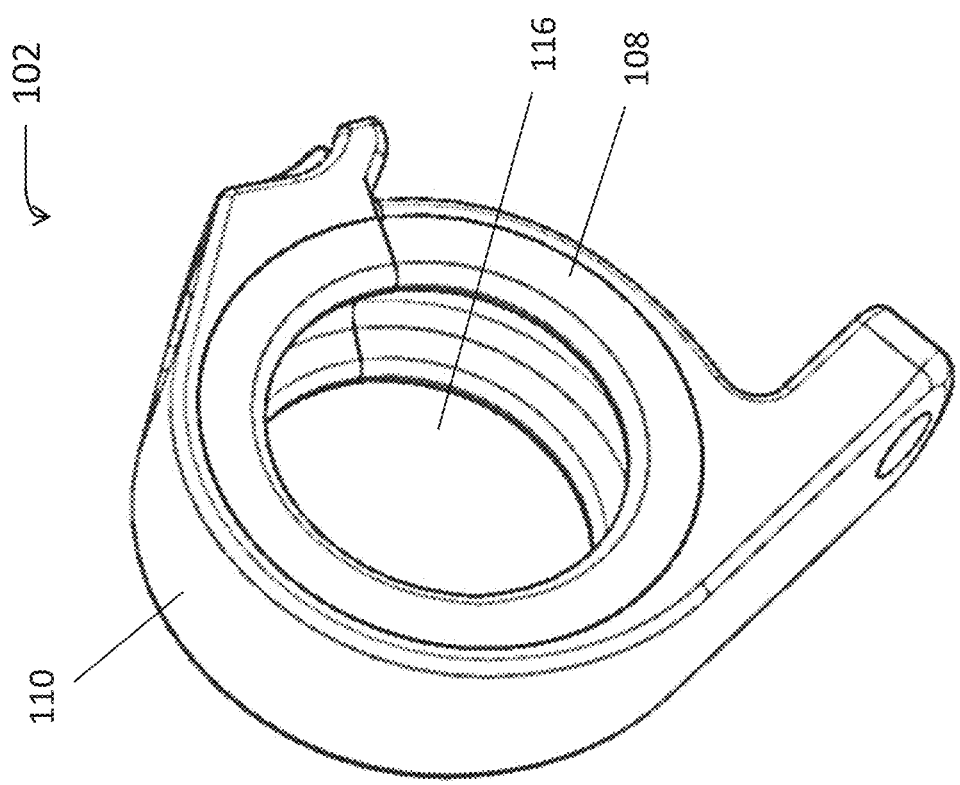
FIG. 21 is a P-clamp according to some embodiments.

Although the first and second clamp members are shown as being moveable relative to each other via the hinge, in other embodiments, the first and second clamp members may be moveable relative to each other without a hinge. For example, in some embodiments, as shown in FIG. 21, the first and second clamp members may be directly attached to another. For example, the first and second clamp members may be integrally formed with one another. In such embodiments, the P-clamp may include a unitary structure with first and second clamp member sections. In such embodiments, at least a portion of the first and/or second clamp member sections may be formed of a flexible material such that the first and second clamp member sections may be moved away from one another to allow a wire bundle to be inserted into the opening 116 of the P-clamp.

Figure 22:
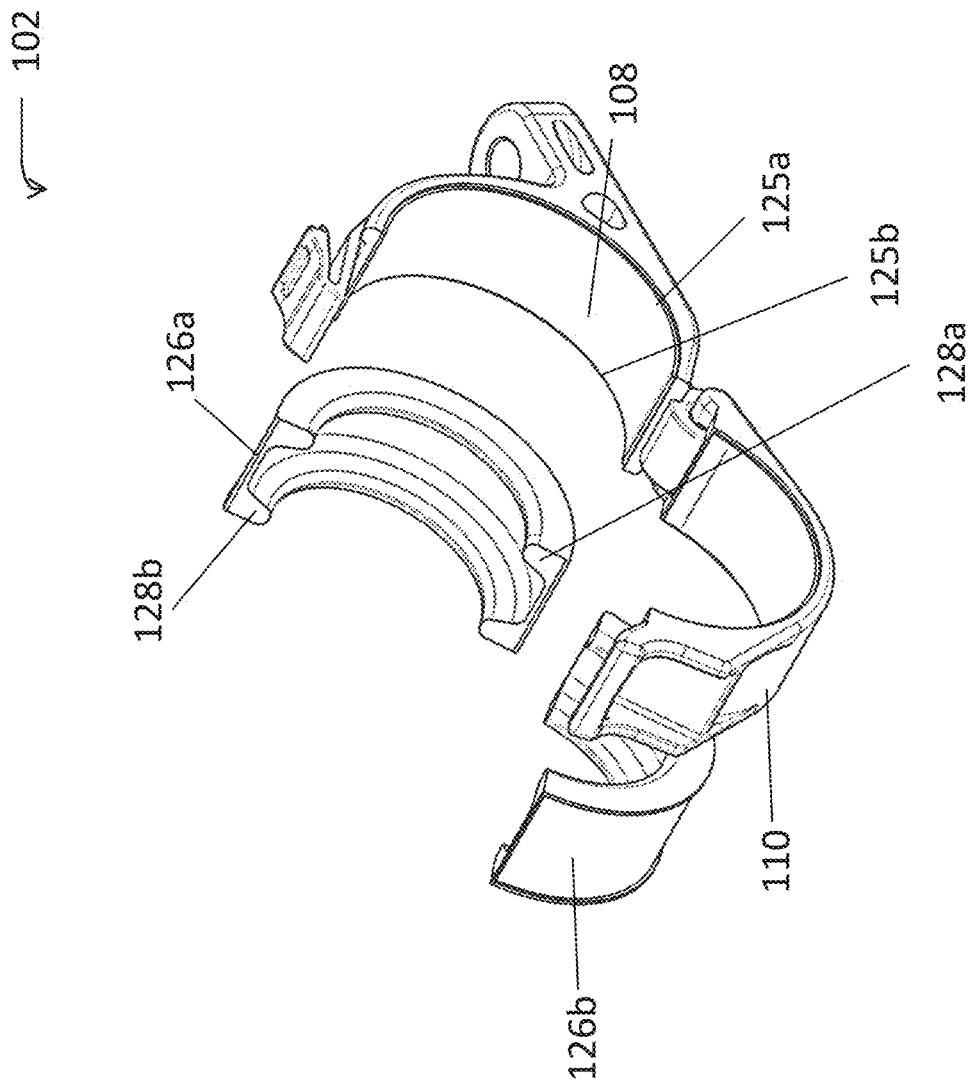
FIG. 22 is a partially exploded view of a P-clamp according to some embodiments.

In some embodiments, the P-clamp may include an inner support or cushion for supporting the wire bundle. In some embodiments, the cushion may allow the P-clamp to accommodate wire bundles having different diameters. As shown in FIG. 22, in some embodiments, a first cushion 126a may be attached to the first clamp member 108 and a second cushion 126b may be attached to the second. As will be appreciated, in such embodiments, the inner surface of the first and second cushions 126a, 126b may cooperate to form the circular cross-sectional opening into which the wire bundle extends. In some embodiments, the cushion may be overmolded onto the first and second clamp members. The cushion also may be bonded onto the first and second clamp members, such as via an adhesive. In some embodiments, the cushion is formed of a silicone material. In some embodiments, the first and second clamp members may be formed of a silicone material with PEEK polymer.

Figure 23:
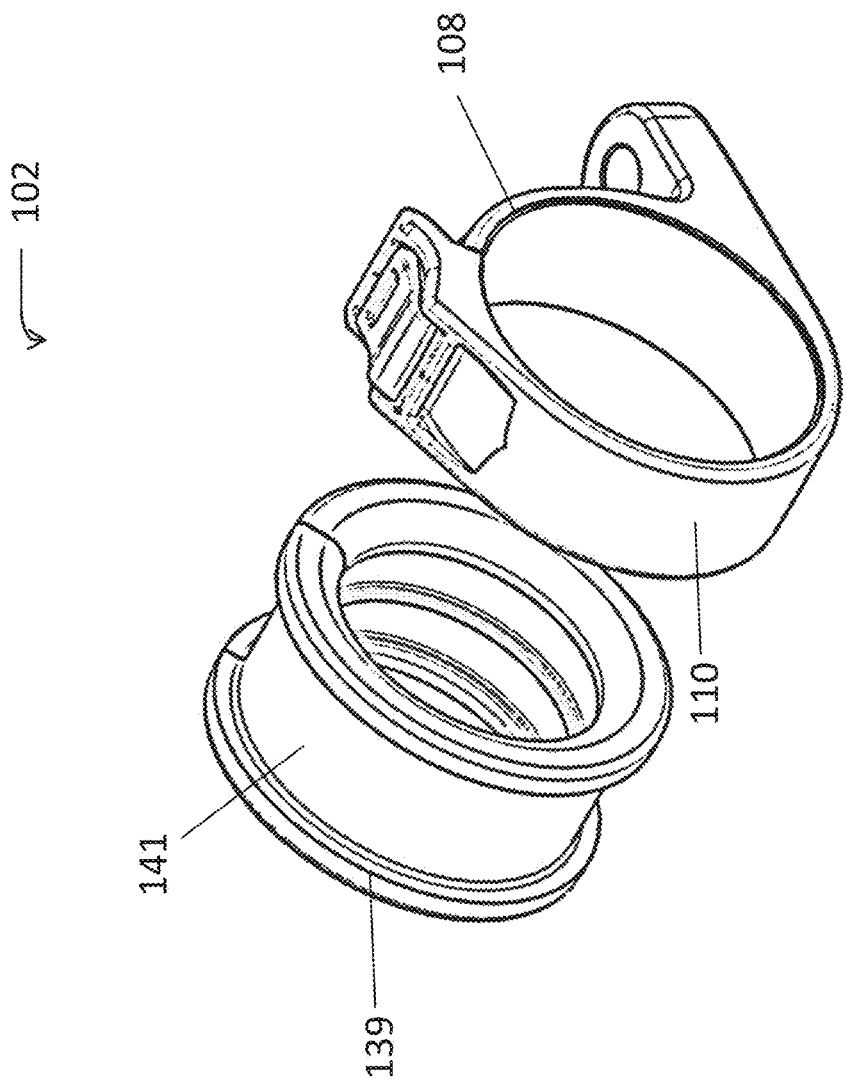
FIG. 23 is a partially exploded view of a P-clamp according to other embodiments.

In some embodiments, as shown in FIG. 23, the cushion may include a grommet 141 that may be removably attachable to the first and second clamp members of the P-clamp. In some embodiments, the grommet may include a channel 141 for receiving the first and second clamp members (or first and second clamp member portions). In such embodiments, the shape and size of the channel may correspond to the shape and size of the first and second clamp members.

In some embodiments, the cushion may allow the use of the same P-clamp with a wide range of bundle diameters. For example, as shown in FIGS. 24-25, the first cushion 126a may include first and second lobes 128a, 128b. In some embodiments, the first and second lobes 128a, 128b may be located at or near the first and second sides 125a, 125b of the first clamp member 108. As shown in these views, the lobes may extend radially towards a center of the opening of the P-clamp (see the lobe height labeled H). In some embodiments, as shown in FIG. 24, the first clamp member has an inner cushion diameter D3, between the peaks of the lobes, and an outer cushion diameter D4, between the base or crest of the lobes. In this regard, a bundle 114 with a smaller diameter may be supported between the peaks of the lobes when the bundle is held by the P-clamp (see, e.g., FIG. 24). When a larger diameter bundle 114 is inserted in the P-clamp (see, e.g., FIG. 15), the lobes may deflect, compress, and/or otherwise deform to allow the P-clamp to reach a diameter greater than the inner cushion diameter. In some embodiments, the P-clamp may not accept bundles having a diameter greater than the outer cushion diameter D4. In some embodiments, the inner cushion diameter D3 may be between about 3 mm and about 50 mm. In some embodiments, the outer cushion diameter D4 may be between about 5 mm and about 60 mm. As will be appreciated, the second cushion also may have first and second lobes similar to that of the first cushion.

Although the cushion is shown as having two lobes, it will be appreciated that the cushion may include only one lobe or may include more than two lobes. Also, although the lobes are shown as being positioned at the first and second sides 125a, 125b of the P-clamp, it will be appreciated that the lobes may be positioned at other locations between the first and second sides 125a, 125b of the P-clamp. In a similar manner, although the lobes are shown as extending around an entire circumference of the P-clamp, the lobes may extend along only a portion of the circumference of the P-clamp.

Although the lobes in the first and second cushions are shown as being the same in FIGS. 7 and 22, for example, the number, location, and position of the lobes of the first cushion may be different from the number, location, and position of the lobes of the second cushion. For example, while the first cushion may include two lobes at the first and second sides of the P-clamp, the second cushion may not have any lobes and may instead be of a uniform thickness. In a similar manner, although the grommet is shown as having the same number and sized lobes around the entire inner surface, the length, size, and number of lobes may vary.

Figure 26:
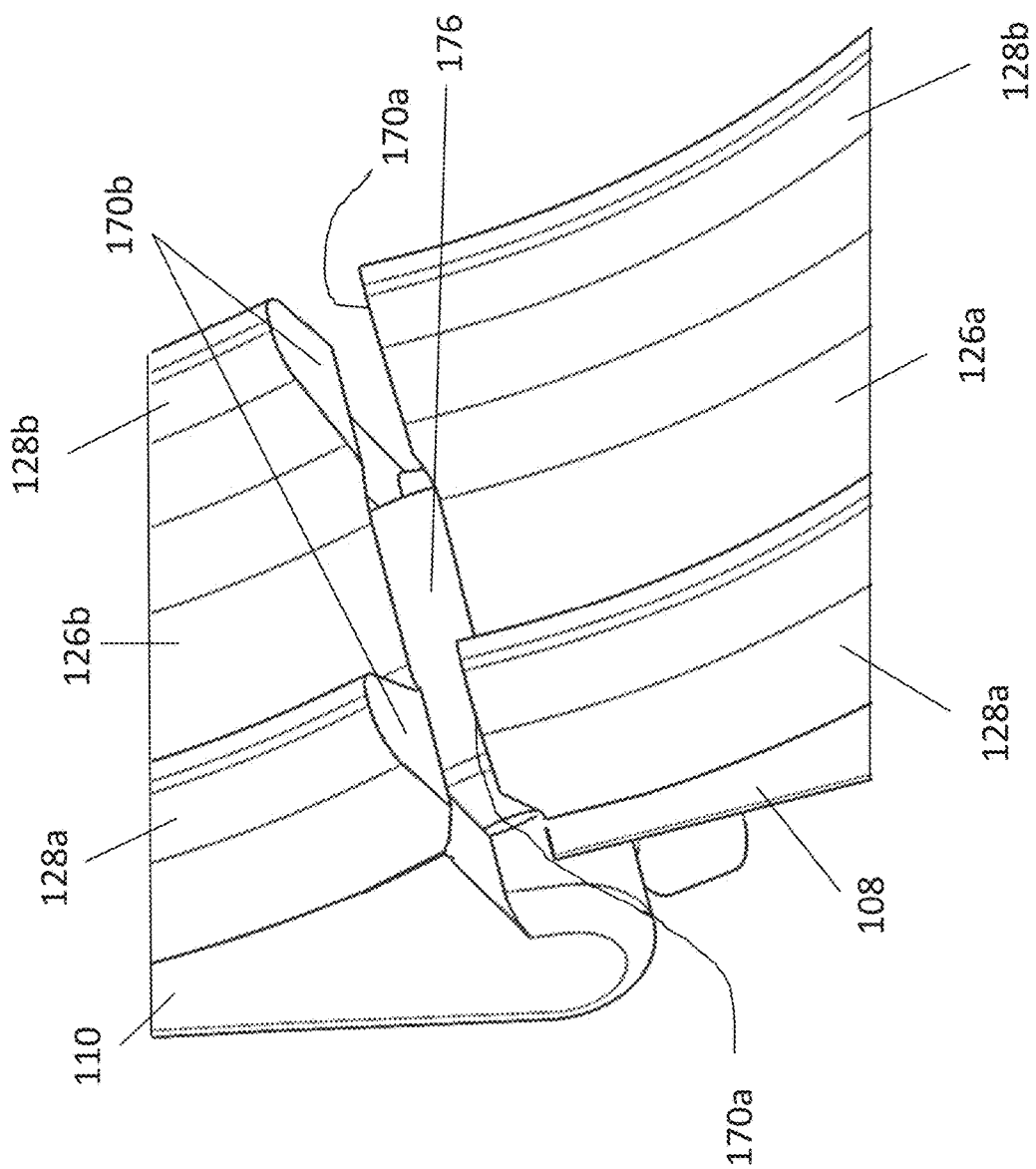
FIG. 26 is an enlarged view of a portion of a P-clamp according to some embodiments.

As shown in at least FIG. 6, when the first and second clamp members are moved together to close the P-clamp, the first and second cushions cooperate with one another to form the circular cross-sectional opening for receiving the wire bundle. In some embodiments, as shown in FIG. 26, the first cushion 126a may have a first end surface 170a arranged to contact a corresponding second end surface 170b of the second cushion 126b when the first and second clamp members are moved together to close the P-clamp. In some embodiments, the first and second end surfaces may include first and second planar end surfaces. In some embodiments, as shown in FIG. 26, the first and second lobes 128a, 128b of each of the first and second cushions may include the corresponding planar end surfaces.

In some embodiments, the first and second planar end surfaces may be substantially parallel to one another when the first and second clamp members are together. In some embodiments, the first and second planar end surfaces may be substantially parallel to a plane extending through a respective end surface 172a, 172b of the first and second clamp members (see FIG. 28). In some embodiments, the first and second cushions are compressed at the first and second end surfaces when the first and second clamp members are moved together to close the P-clamp.

Figure 28:
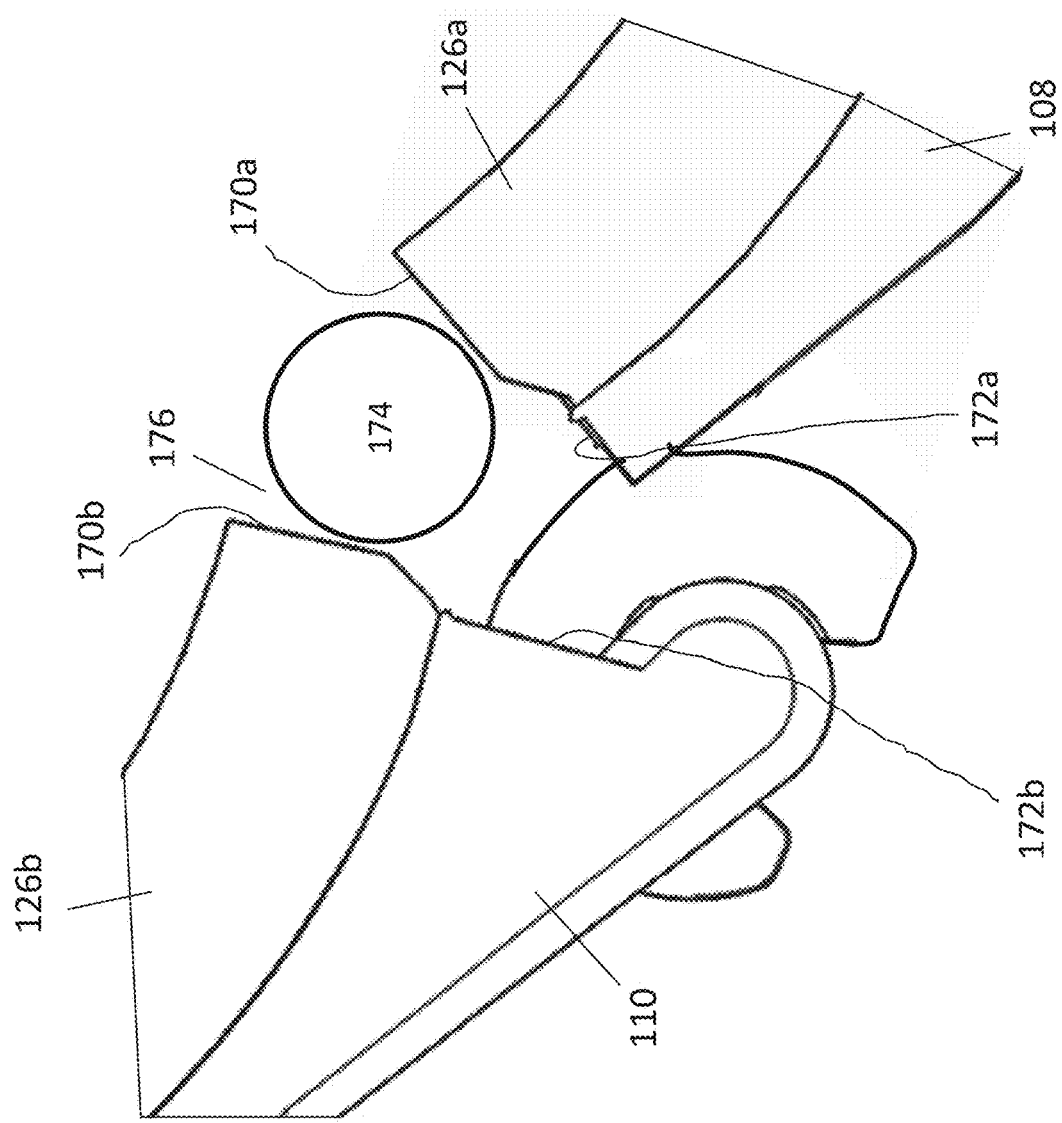
FIG. 28 is side view of the P-clamp of FIG. 26, with a wire shown in the P-clamp.

As shown in FIG. 28, in some embodiments, a wire 174 may be moveable into a gap 176 formed between the first and second cushions (e.g., between the first and second end surfaces 170a, 170b) when the first and second clamp members 108, 110 are in the open position. As shown in FIG. 26, the gap may extend from the inner surface of the cushion to the hinge of the clamp, and from the first and second sides of the cushion (e.g., from the first lobe to the second lobe). In some embodiments, when the first and second clamp members 108, 110 are moved towards one another to close the P-clamp, the wire may remain in the gap and become pinched between the first and second end surfaces. In such embodiments, the installer may move the wire while closing the P-clamp to position the wire in the opening formed between the two cushions.

Figure 29:
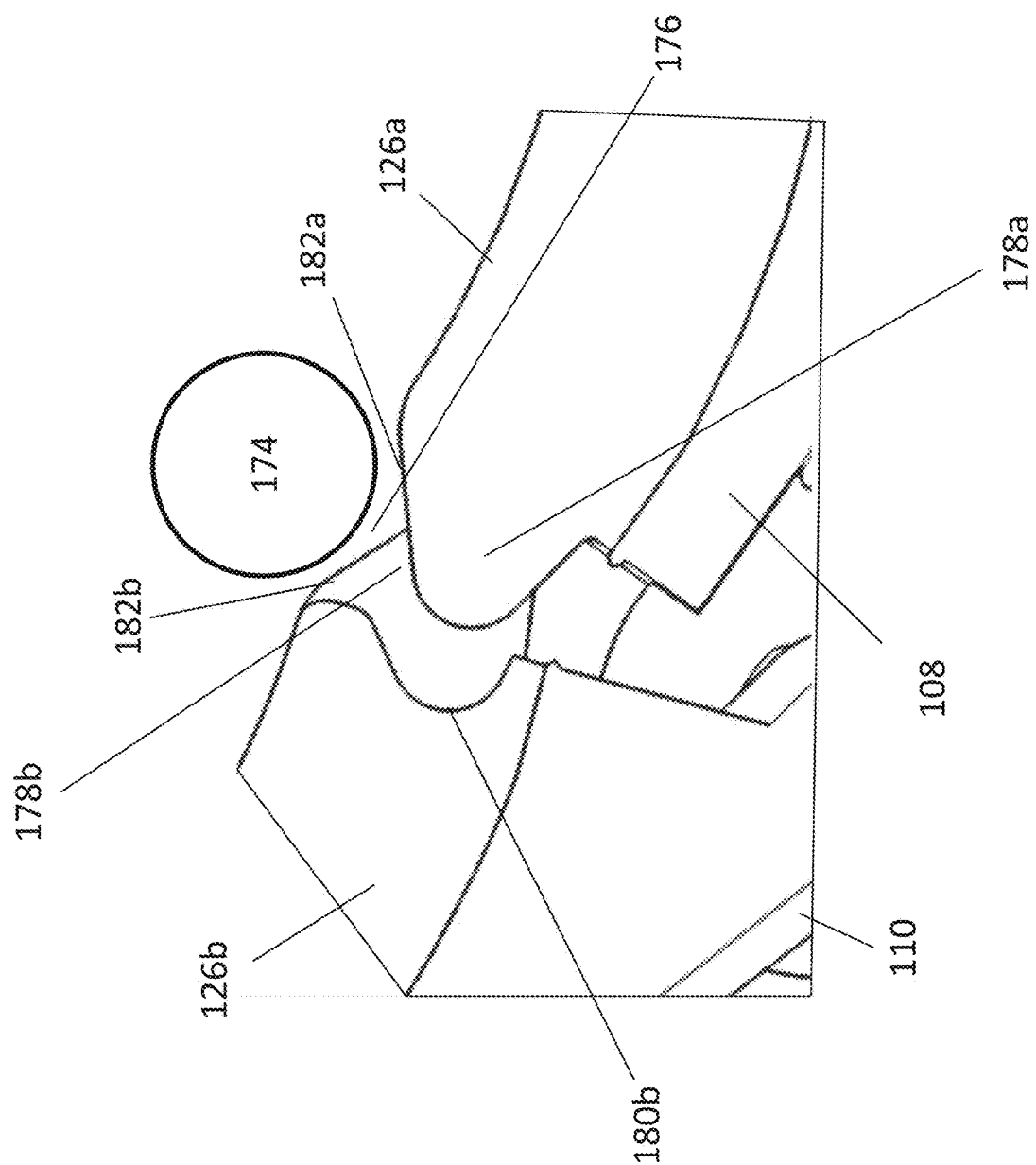
FIG. 29 is a side view of the P-clamp of FIG. 27, with a wire shown in the P-clamp.

In some embodiments, as shown in FIG. 29, the first and second cushions may be arranged such that the wire is not moveable into the gap between the first and second cushions and/or is moveable out of the gap when the clamp is closed. As shown in FIG. 29, for example, in some embodiments, at least a portion of the first and second cushions may be arranged to overlap one another when the P-clamp is in the open position. In such embodiments, the overlapping portions of the cushions may maintain the wire substantially in the opening formed between the first and second cushions when the clamp is in the open position.

Figure 27:
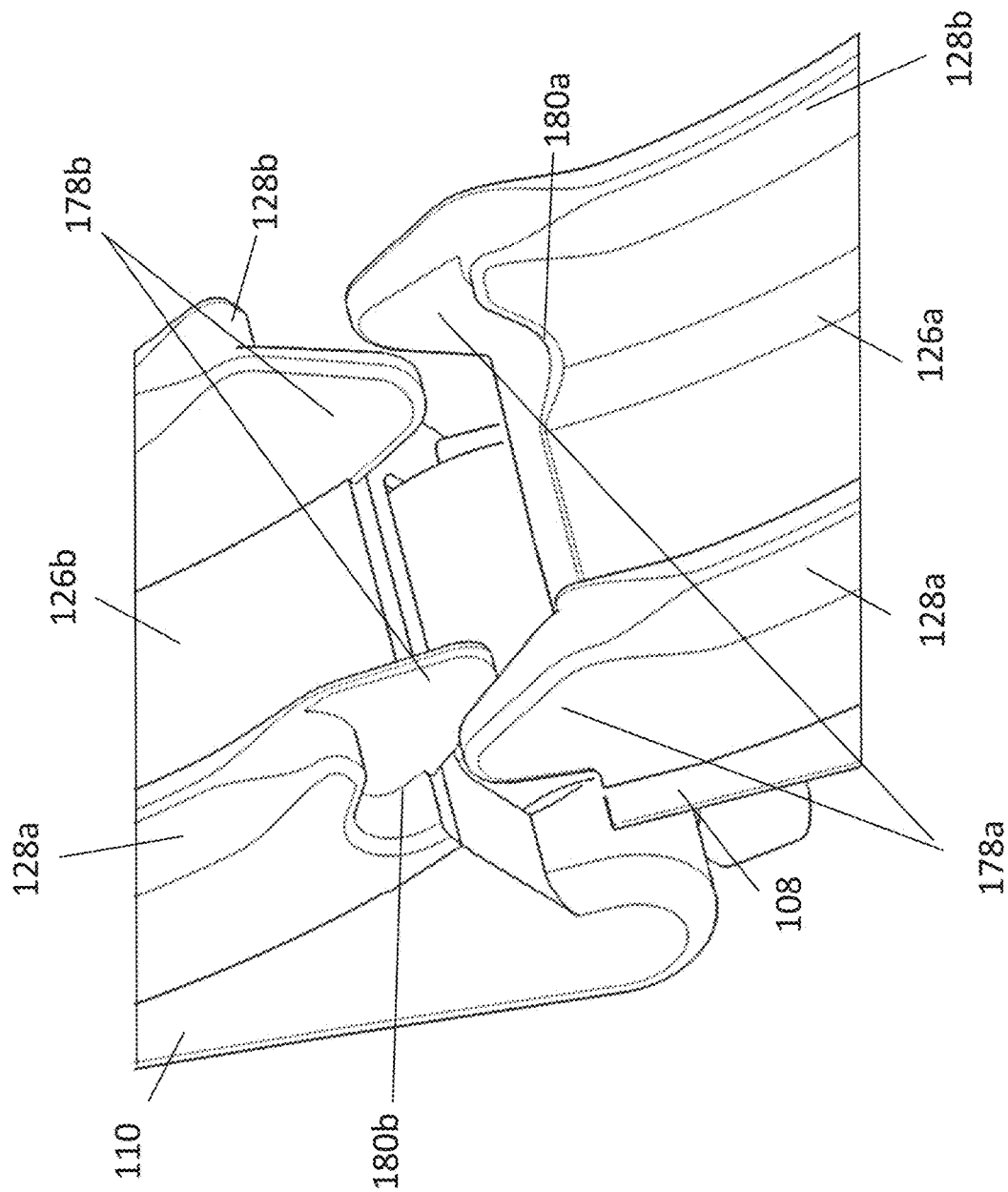
FIG. 27 is an enlarged view of a portion of a P-clamp according to other embodiments.
Figure 31:
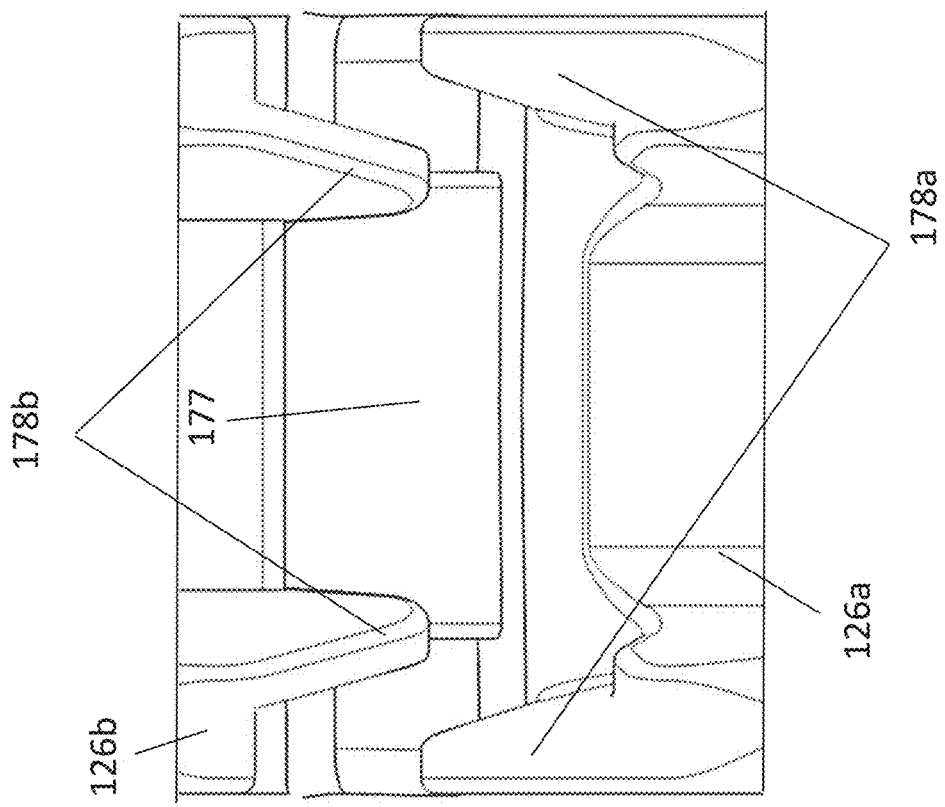
FIG. 31 is another view of the portion of the P-clamp of FIG. 27.
Figure 30:
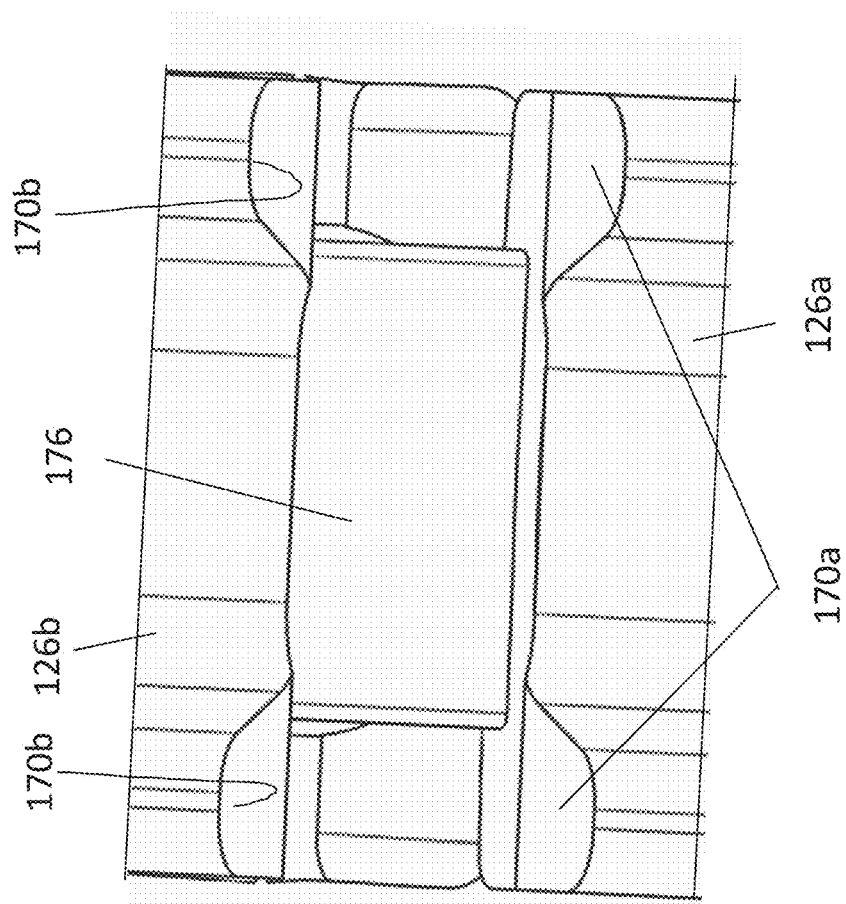
FIG. 30 is another view of the portion of the P-clamp of FIG. 26.
Figure 33:
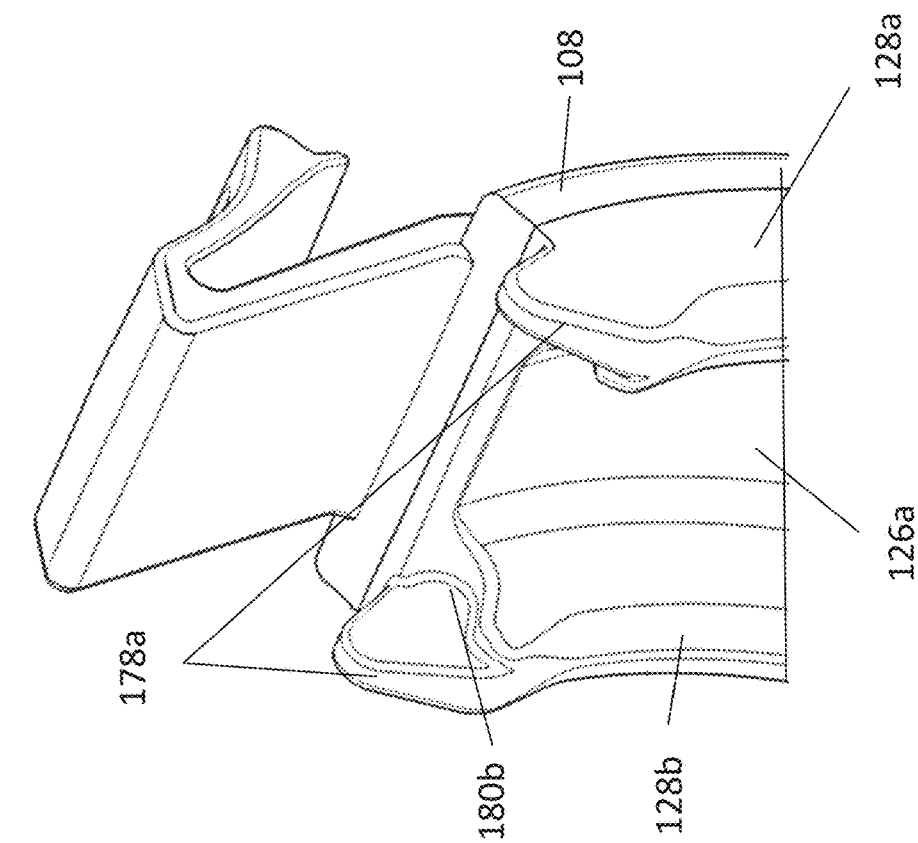
FIG. 33 is a perspective view of a distal end of a first clamp member of the P-clamp of FIG. 27.
Figure 32:
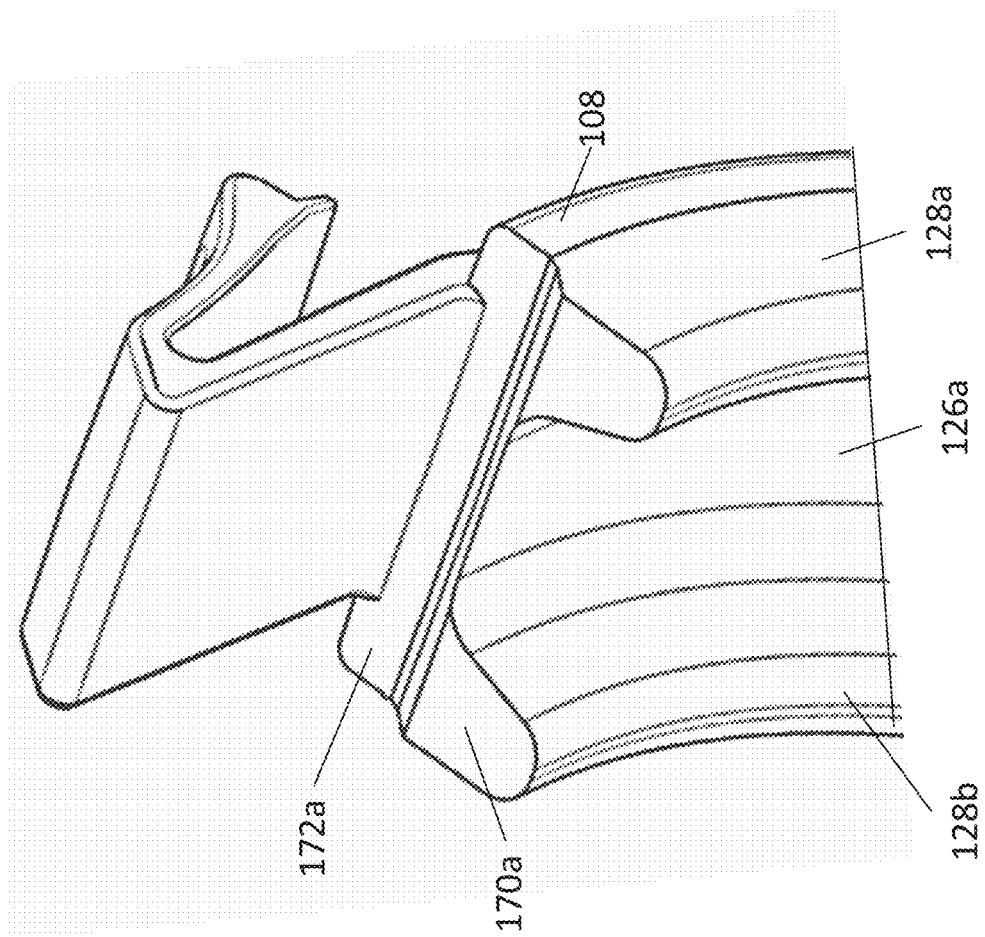
FIG. 32 is a perspective view of a distal end of a first clamp member of the P-clamp of FIG. 26.

In some embodiments, as shown in FIGS. 27, 29, and 31, each of the first and second cushions may include one or more protrusion 178a, 178b. In some embodiments, a protrusion may be formed in the first and second lobes of each of the first and second cushions. In some embodiments, as shown in FIG. 29, at least a portion of the protrusions of the first cushion may overlap at least a portion of the protrusions of the second cushion. For example, a protrusion formed in the first lobe of the first cushion may at least partially overlap with a protrusion formed in the first lobe of the second cushion. In some embodiments, a distal end of each protrusion may be arranged to overlap another, adjacent, protrusion.

In some embodiments, as shown in FIGS. 27, 29, and 31, each of the protrusion 178a, 178b may be at least partially received in a corresponding opening 180b, 180a in the respective first and second cushions. In some embodiments, the openings may be formed in the first and second lobes of each of the first and second cushions. Similar to the above, the first and second protrusions may be compressed against the corresponding openings when the first and second clamp members are moved together to close the P-clamp.

In some embodiments, the protrusions may be substantially triangular in cross-sectional shape, although the protrusions may have other suitable shapes. For example, the protrusions may be semicircular, circular, oval, rectangular, square, or other suitable shape. In such embodiments, the openings may have a shape and size that at least partially corresponds to the shape and size of the respective protrusion. For example, as shown in FIG. 29, the opening 180b has a shape and size that corresponds to at least a distal end of the protrusion 178a.

In some embodiments, each of the protrusions may include an inwardly facing ramped surface 182a, 182b against which the wire 174 may rest when the clamp is in the open position. In some embodiments, each ramped surface may be angled relative to the plane extending through the end surface of the corresponding first and second clamp member. For example, the ramped surface may be angled between about 0° and about 60° relative to the respective plane.

In some embodiments, a gap 176 may be formed between the ramped surfaces, with the wire being receivable in the gap. A gap 177 also may be formed between the lobes of each cushion (see FIG. 31), although in some embodiments, the ramped surfaces may prevent the wire from moving into gap 177 between the lobes. In some embodiments, when the first and second clamp members are moved towards one another to close the clamp, the wire may travel up the ramped surface to the inner surface of the first and second cushion.

Although the same P-clamp is shown as being able to accommodate a wide range of bundle diameters (e.g., between the inner and outer cushion diameters), in some embodiments, the clamp assembly may include a single support and two or more differently sized P-clamp, each P-clamp being able to accommodate a smaller range of bundle diameters. For example, instead of having a single clamp that may accommodate bundle diameters between about 3 mm and about 60 mm, the clamp assembly may include a kit with three P-clamps, the first of which may accommodate bundle diameters between about 3 mm and about 20 mm, the second of which may accommodate bundle diameters between about 21 mm and about 40 mm, and the third of which may accommodate bundle diameters between about 41 mm and about 60 mm.

In a similar fashion, in some embodiments, the P-clamp assembly may a kit with a single P-clamp and multiple, differently sized, grommets from which an installer can choose. In one such example, the P-clamp may include three removable grommets, the first grommets being able to accommodate bundle diameters between about 3 mm and about 20 mm, the second grommet being able to accommodate bundle diameters between about 21 mm and about 40 mm, and the third grommet being able to accommodate bundle diameters between about 41 mm and about 60 mm. During use, the installer may insert the grommet corresponding to the diameter of the wire bundle being installed into the P-clamp. Although the P-clamp is described as having three removable grommets that the installer may choose from, it will be appreciated that the P-clamp may include only two grommets or may include four or more grommets that are insertable into the P-clamp.

As shown in FIG. 5, the P-clamp is configured to secure the bundle of wires in the P-clamp when the first and second clamp members are secured to one another. In some embodiments, the P-claim includes one or more fasteners arrangement to secure the first and second clamp members in a closed position. For example, the first clamp member may include a fastener that engages with a corresponding fastener on the second clamp member.

Figure 34:
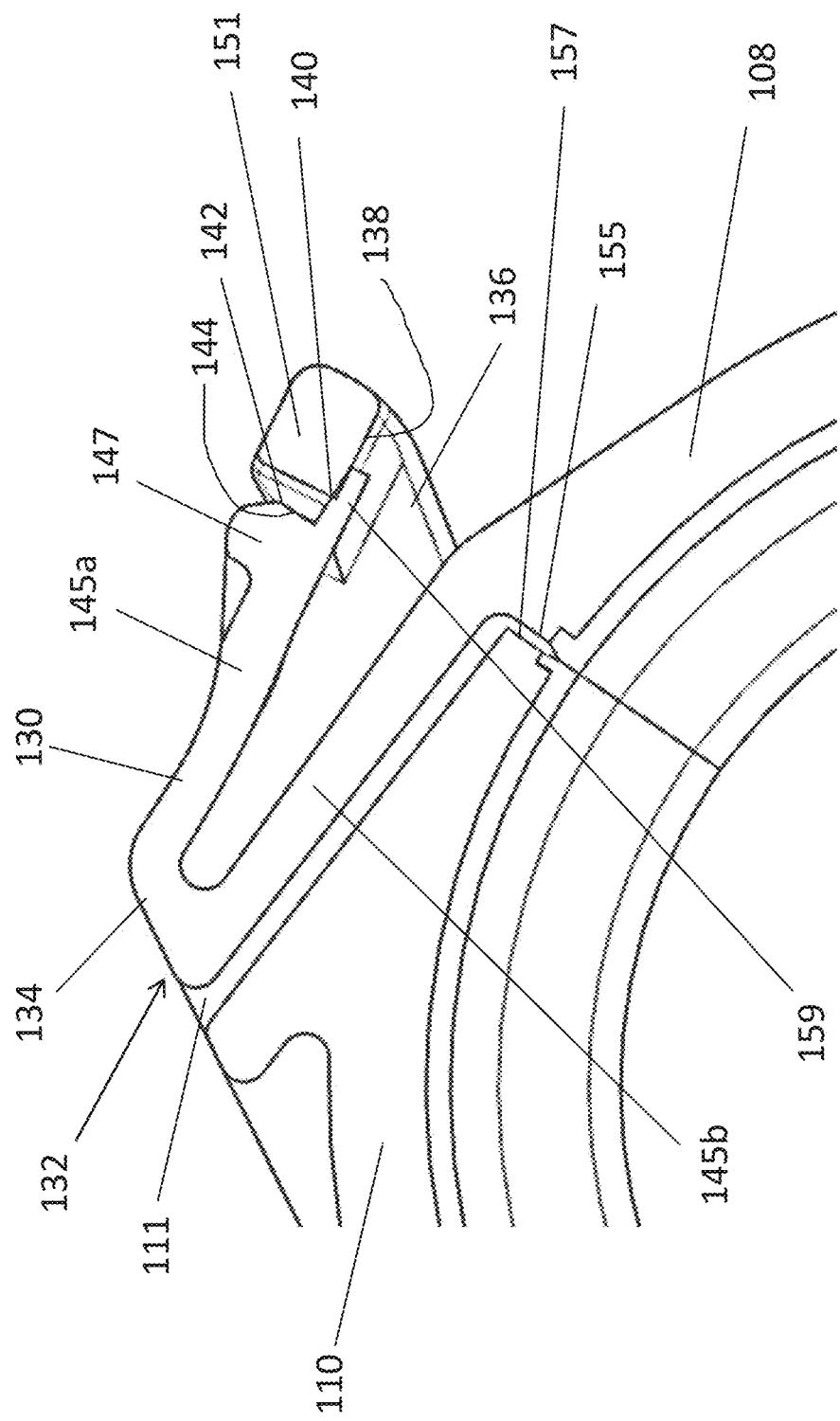
FIG. 34 is an enlarged cross-sectional side view of a clip of a first clamp member being engaged with a housing of a second clamp member according to some embodiments.
Figure 35:
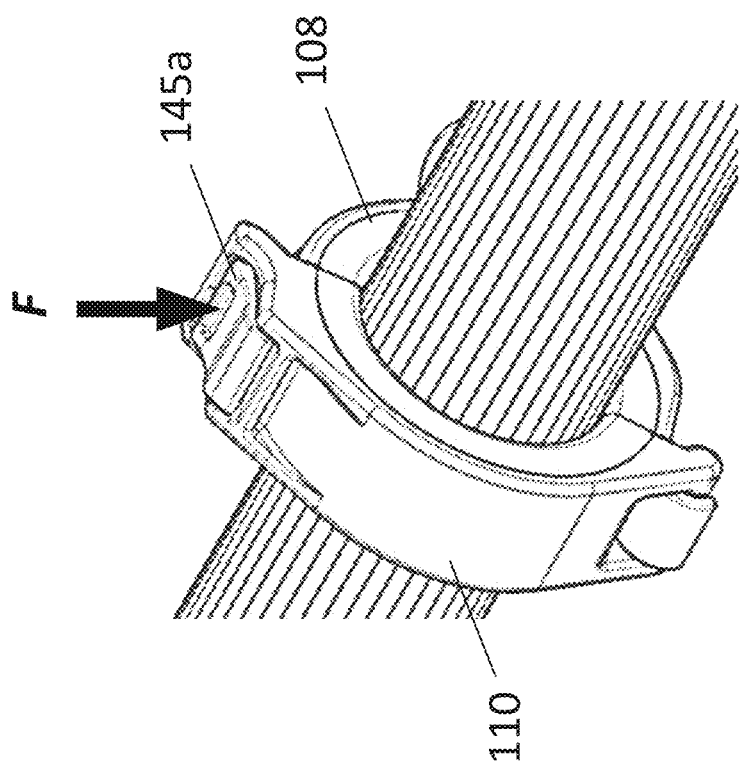
FIG. 35 illustrates a force being applied to a clip of a P-clamp to disengage a first clamp member from a second clamp member.

In some embodiments, the P-clamp may include a snap-in mechanism to secure the first and second clamp members together. For example, as shown in FIGS. 9 and 34, the first clamp member 108 may include a snap or clip 130 that engages with a channel 111 in a housing 132 of the second clamp member 110. In some embodiments, as shown in FIGS. 8, 9, and 35, the clip may be located on a distal end of the first clamp member, opposite the hinge. In such embodiments, the clip also may be spaced from the mounting flange 107. In some embodiments, as shown in these views, the housing may be located on a distal end of the second clamp member, also opposite the hinge.

As will be appreciated, the location and orientation of the snap-in mechanism may vary in other embodiments. For example, as shown in FIGS. 51 and 52, the housing 132 may be located at the end of the first clamp member 108, spaced from the mounting flange 107, while the clip 130 is located at the end of the second clamp member 110. FIGS. 49 and 50 show the arrangement with the clip 130 at the end of the first clamp member 108, spaced from the mounting flange 107, and the housing 132 located at the end of the second clamp member 110.

FIGS. 53 and 54 illustrate an example in which the clip 130 and housing 132 are both located on a side of the P-clamp opposite the mounting flange 107. In such an example, the clip and housing may be located at the ends of the first 108 and second 110 clamp members, respectively, although the clamp members may be different sizes. For example, the first clamp member 108 may be longer than the second clamp member 110. FIGS. 55 and 56 illustrate an example in which both the clip 130 and housing 132 are adjacent to the mounting flange 107 of the P-clamp. In this example, the clip may be attached to the second clamp member 110 while the housing may be attached to the first clamp member 108. As with the example shown in FIGS. 53 and 54, the housing and clip may both be located at the ends of the first and second clamp members, respectively, although the first and second clamp members are different sizes. In this example, the second clamp member may be longer than the first clamp member.

In some embodiments, as shown in FIGS. 9 and 34 the clip may be substantially U-shaped. As will be appreciated, the clip may have other suitable shapes in other embodiments. For example, in some embodiments, the clip may be substantially V-shaped. In some embodiments, the U-shaped clip may have first and second arms 145a, 145b. In some embodiments, as shown in FIG. 34, when the first and second clamp members are secured together, the first arm may be positioned outwardly of the second arm. For purposes herein, being positioned outwardly may mean that the first arm is located further away from a center of the P-clamp (e.g., a center of the opening receiving the wires(s)) than the second arm and facing a user. In such embodiments, the first arm may be positioned on top of the second arm.

In some embodiments, the first arm includes one or more engagement surfaces arranged to engage with corresponding contact surfaces of the housing to secure (e.g., hold) the clip in the housing. In some embodiments, as shown in FIG. 34, the first arm may include first and second engagement surfaces 140, 142. In some embodiments, the first engagement surface is upwardly facing. In some embodiments, the second contact surface faces in a direction opposite the direction of entry of the clip into the channel. In some embodiments, the first and second engagement surfaces are substantially perpendicular to one another, although they may have other suitable arrangements. In some embodiments, the clip may have a curved or ramped surface 147 adjacent to the second contact surface.

In some embodiments, as shown in FIG. 7, the housing may include a channel 111 sized to receive the clip. In some embodiments, the channel is formed between first and second sidewalls 149a, 149b of the housing, a bottom or floor 151 of the channel, and a top 153 of the housing. In some embodiments, the top, also referred to as a connector, may connect the first and second sidewalls of the housing. The connector also may be located opposite the bottom or floor of the channel. In some embodiments, as shown in FIGS. 7 and 34, the channel may be open at both first and second ends, with the clip being inserted into the first end 136 of the channel, at a first end of the housing. In some embodiments, as shown in these views, the top of the housing may extend along only a portion of the length of the channel. For example, the top may be located only at or near the first end 136 of the channel (and the first end of the housing). In such embodiments, when the clip is fully seated in the channel, at least a portion of the clip is exposed. For example, in some embodiments, as shown in FIGS. 34 and 35, the first arm of the clip may be at least partially exposed. In some embodiments, a portion of an outwardly facing side of the first arm may be exposed (e.g., a portion of the arm facing in a direction away from the center of the opening). In some embodiments, the entire outwardly facing side of the first arm of the clip may be exposed, except for where the first arm engages with the housing. In some embodiments, the first arm may be engaged with the housing at a tail or ledge of the first arm. The distal end of the clip 134 also may be exposed when the clip is fully seated in the channel.

In some embodiments, the top of the housing includes first 138 and second 144 contact surfaces arranged to engage with corresponding engagement surfaces of the clip. In some embodiments, to engage the clip with the housing, the installer may insert the distal end 134 of the clip into the first end 136 of the channel, at the first end of the housing (see FIG. 34). As will be appreciated, in embodiments in which the clip is attached to a stationary first clamp member, the second clamp member may be moved to the first clamp member to insert the clip into the channel in the housing.

In some embodiments, when the clip is inserted into the channel, the first and second arms 145a, 145b of the clip may be moved towards one another (see FIG. 42) so that the first arm (e.g., a curved surface 147 of the first arm) may pass below the first, downwardly facing contact surface 138 of the housing. Once the first arm (e.g., the curved surface 147) is moved past the first contact surface 138, the first arm may move (e.g., snap) in an upward direction until the first, upwardly facing engagement surface 140 of the first arm 145a contacts the first contact surface 138 of the housing. In some embodiments, the first arm of the clip may be biased in an upward (e.g., outwardly) direction, away from the second arm and the center of the P-clamp, and the first contact surface 138 may be arranged to stop travel of the first arm in the upward direction. Such engagement also may stop the clip from moving in the upward direction and out of the housing.

FIG. 34 illustrates the clip fully seated in the channel, with the first engagement surface 140 of the clip engaging with the first contact surface 138 of the housing. As shown in this view, the upwardly facing engagement surface 140 may be located at or near a proximal end of the first arm 145a of the clip in some embodiments. As also shown in FIG. 34, when the clip is seated in the channel of the housing, the second engagement surface 142 of the clip engages with the second contact surface 144 of the housing. In some embodiments, engagement between the second engagement surface of the clip and the second contact surface of the housing may prevent the clip from moving out of the housing (e.g., in a direction opposite the direction of entry of the clip into the first end 136 of the channel).

As shown in FIGS. 34, engagement between the first clamp member and the housing may prevent movement of the clip out of the second end of the housing. For example, the first clamp member and the housing may have corresponding contact surfaces 155, 157 that limit travel of the clip in a direction towards and out of the second end of the housing when the first and second clamp members are secured together.

In some embodiments, the engagement surfaces of the clip may be formed at or near the proximal end of the first arm 145a. For purposes herein, the proximal end of the first arm may include the end of the first arm opposite the distal end of the clip. In some embodiments, as shown in FIG. 34, the first engagement surface 140 may be formed on a ledge or tail 159 of the first arm 145a. In some embodiments, the tail extends outwardly from the proximal end of the first arm. In some embodiments, the tail may be integrally formed with the first arm, although it will be appreciated that the tail also may be attachable to the first arm. In some embodiments, the tail 159 may be used as a lever to move the first arm towards the second arm, such as for engagement and/or disengagement of the clip in the channel of the housing.

Figure 46:
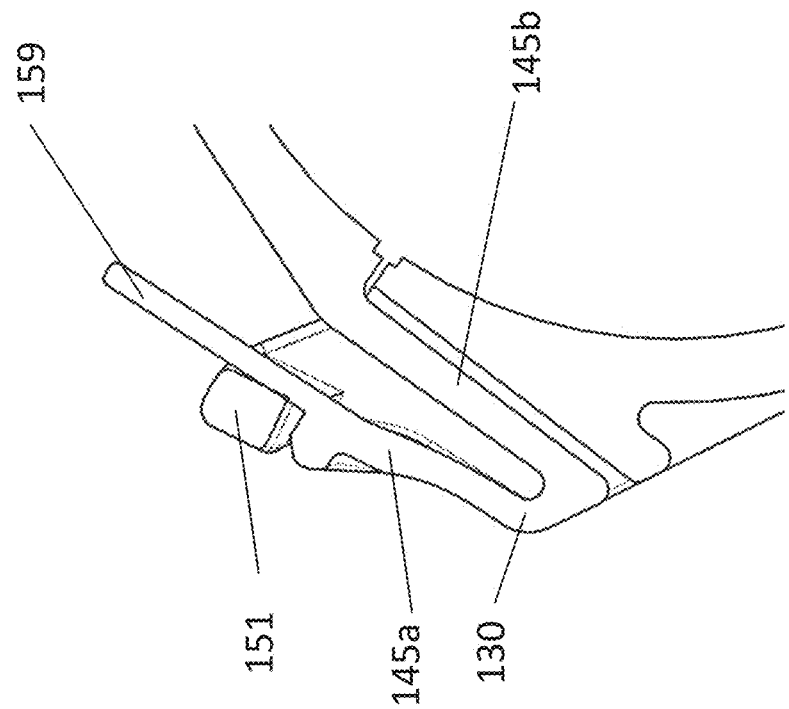
FIG. 46 is a cross-sectional side view of the clamp of FIG. 45.
Figure 45:
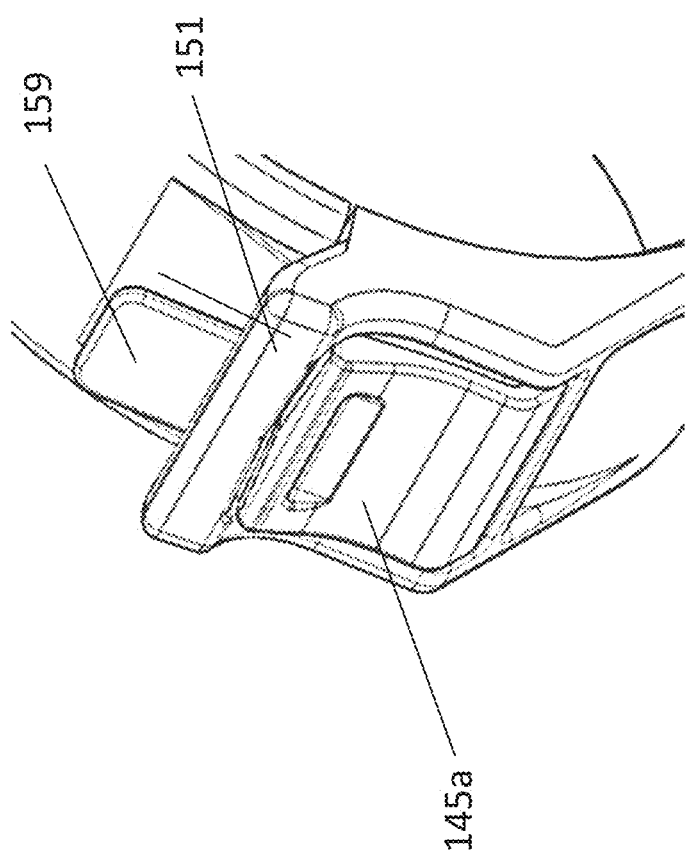
FIG. 45 shows an enlarged perspective view of a clip of a first clamp member engaged with a housing of a second clamp member according to some embodiments.
Figure 48:
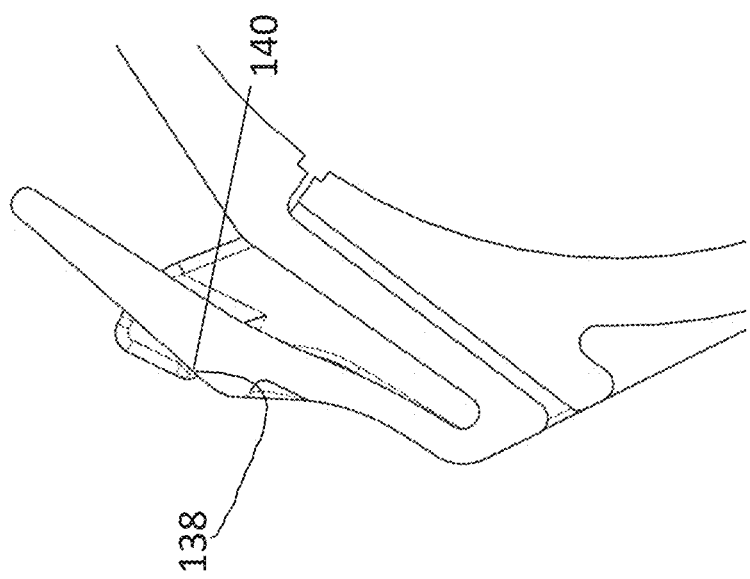
FIG. 48 is a cross-sectional side view of the clamp of FIG. 47.
Figure 47:
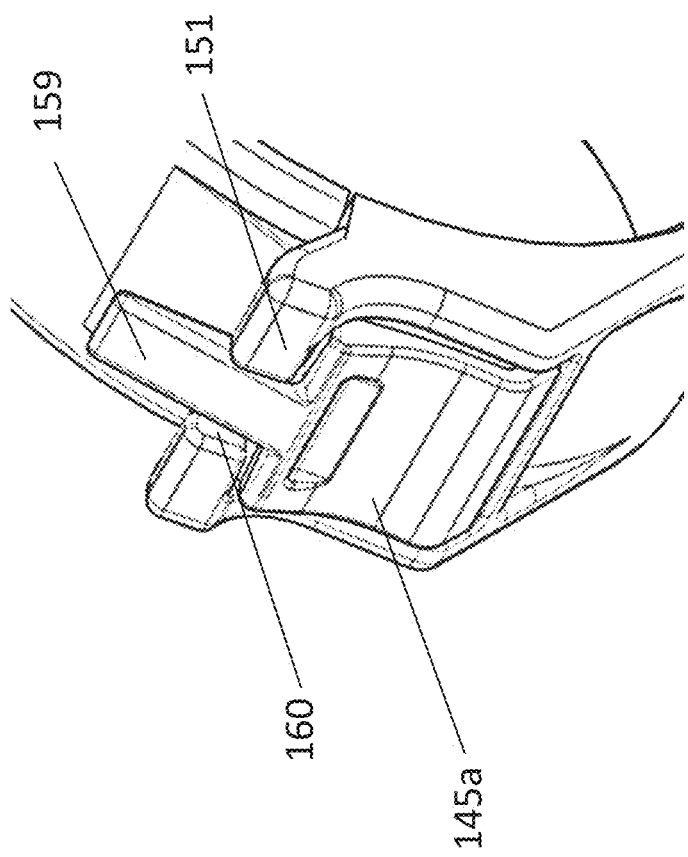
FIG. 47 shows an enlarged perspective view of a clip of a first clamp member engaged with a housing of a second clamp member according to some embodiments.

In some embodiments, as shown in FIG. 34, for example, when the clip is engaged with the housing, the tail 159 of the first arm 145a may extend under but not beyond the top 151 of the housing. As shown in FIGS. 45-46, in other embodiments, the tail 159 of the first arm 145a may extend outwardly beyond the top 151 of the housing when the clip is engaged with the housing. In still another embodiment, as shown in FIGS. 47-48, the tail may extend at least partially through a gap 160 in the top 151 of the housing. In such embodiments, as shown in FIG. 48, one or more downward facing contact surfaces 138 may be formed in one or more side walls of the gap 160 for engaging with the upward facing engagement surface 140 of the clip.

In some embodiments, the P-clamp may be arranged for tool-less opening after the P-clamp has been closed around the bundle of wires. For example, as shown in FIG. 35, the installer may apply a force F to the first arm 145a of the clip to move or otherwise deflect the top of the clip downward and below the first contact surface 138 of the housing (see FIG. 34). In some embodiments, the installer may apply force to a portion of the outwardly facing side of the first arm of the clip. FIG. 36 shows a finger 146 applying the force to the first arm 145a of the clip to disengage the clip from the housing. As will be appreciated, although the clip is shown and described as being operable without a tool, in some embodiments, an installer may also use a tool, such as a screwdriver 148, to apply the force to the first arm 145a of the clip to disengage the clip from the housing (see FIG. 37).

Figures 38, 39:
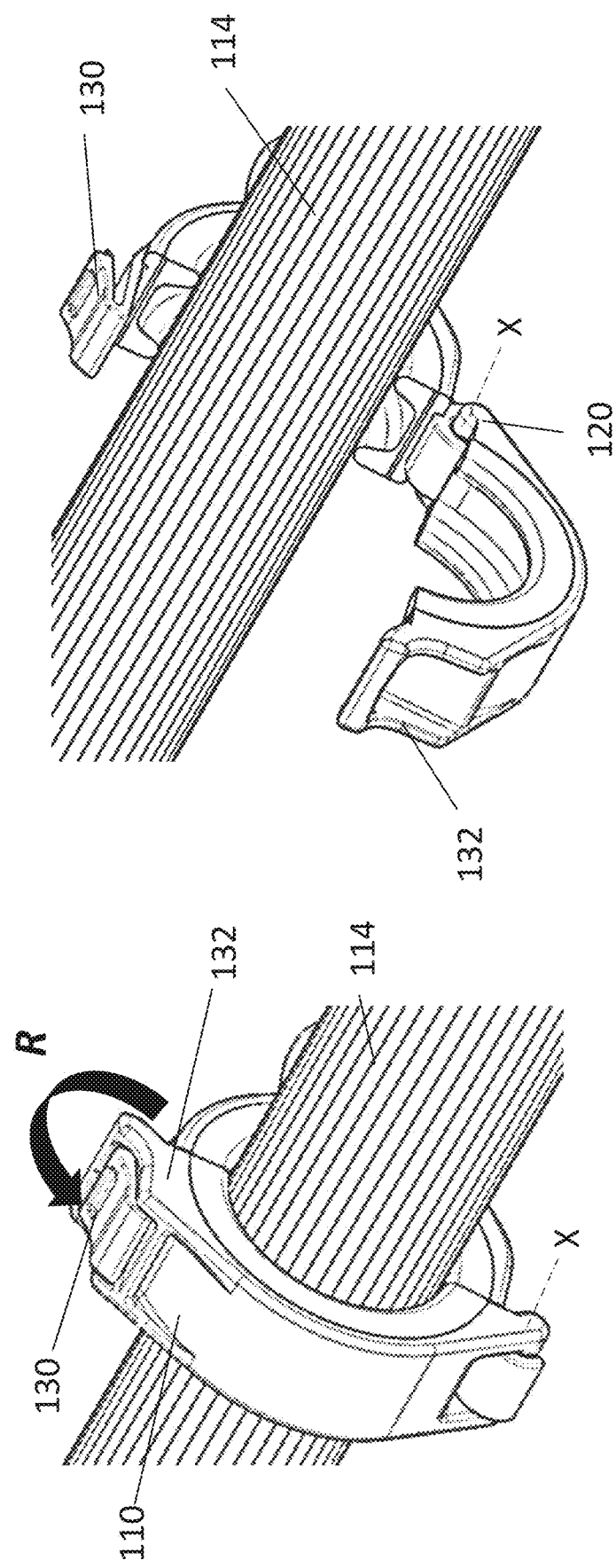
FIGS. 38 and 39 illustrate opening of the P-clamp of FIG. 35, with FIG. 38 showing movement of the second clamp member away from the first clamp member and FIG. 39 showing the clamp in an opened position.

Once the top of the clip is moved below the first contact surface, the installer may move the clip out of the first end 136 of the channel and may move the second clamp member 110 away from the first clamp member 108 (see the arrow labeled R in FIG. 38). As will be appreciated, once the clip has been removed from the housing, the first arm 145a of the clip may snap back in an upward direction to return the clip to its normal, non-deflected position (see FIG. 39). In some embodiments, the installer may pivot the second clamp member 110 about the pivot axis X of the hinge pin 120 to move the second clamp member 110 away from the first clamp member. FIG. 39 shows the P-clamp in an opened position, after the second clamp member 110 has been moved away from the first clamp member 108 and the clip 130 has been disengaged from the housing 132.

Figure 40:
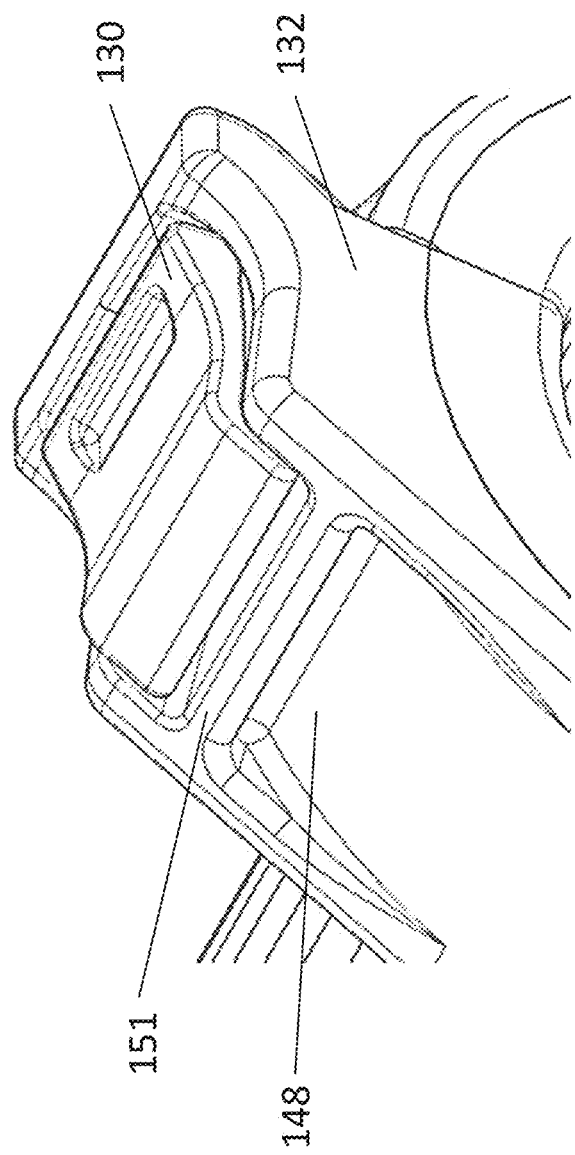
FIG. 40 shows an enlarged perspective view of a clip of a first clamp member engaged with a housing of a second clamp member according to some embodiments.

In some embodiments, the housing 132 may be arranged to protect the clip when the clip is in an engaged position. For example, in some embodiments, the bottom or floor 151 of the channel may act as a protective wall arranged to prevent inadvertent disengagement of the clip and/or to prevent FOD or a tool to be lodged between the clip and the housing. In some embodiments, as shown in FIG. 40, the protective wall 151 may shield the distal end 134 of the clip 130 from a tool or from FOD. Although the bottom or floor of the channel is described as being a protective wall, one or both of the sides 149a, 149b of the housing also may act as protective walls in some embodiments.

Figure 42:
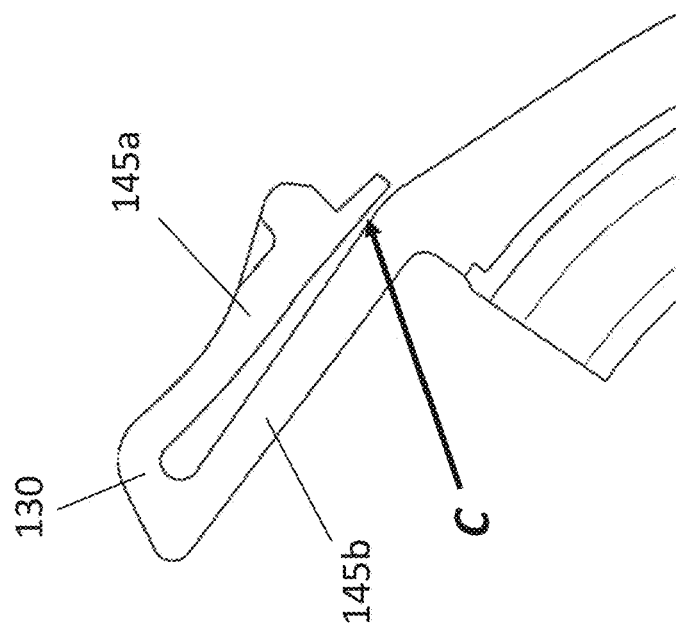
FIG. 42 illustrates a maximum deflection position of a clip of a first clamp member according to some embodiments.

In some embodiments, the protective wall also may prevent over deflection of the clip. For example, in some embodiments, the wall may limit downward travel of the clip within the housing and, thus, may limit the deflection of the first, top arm 145a of the clip relative to the second, bottom arm 145b of the clip. An example of a maximum possible deflection of the clip is illustrated in FIG. 42 (see the arrow labeled C).

Figure 41:
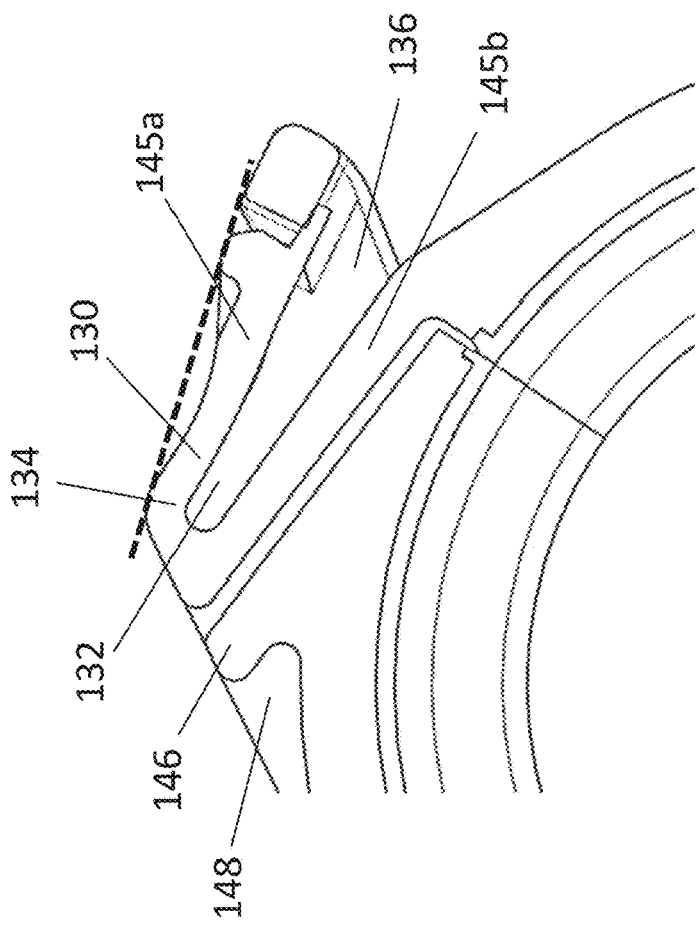
FIG. 41 is a cross-sectional side view of the clamp of FIG. 40.

In some embodiments, as shown in FIGS. 40 and 41, a cavity or pocket 148 may be formed below the protective wall. In some embodiment, the cavity may capture FOD and/or a tool before the FOD and/or tool may contact the clip. In some embodiments, the cavity may be used to assist in closing the clamp. For example, a user may use a tool such as a screwdriver to assist in closing the clamp. As will be appreciated, although the clamp is shown with a cavity in FIGS. 40 and 41, in some embodiments, the cavity may be omitted.

As shown in FIGS. 40 and 41, the cavity 148 may be formed on a side of the housing opposite the first end 136 of the housing into which the clip 130 is inserted. In some embodiments, the bottom or floor (e.g., the protective wall) 151 of the channel may extend substantially parallel to the second, bottom arm 145b of the clip when the clip is engaged with the housing. In some embodiments, the first, top arm 145a of the clip may be angled relative to the bottom or floor (e.g., the protective wall) 151 of the channel when the clip is engaged with the housing.

Figure 44:
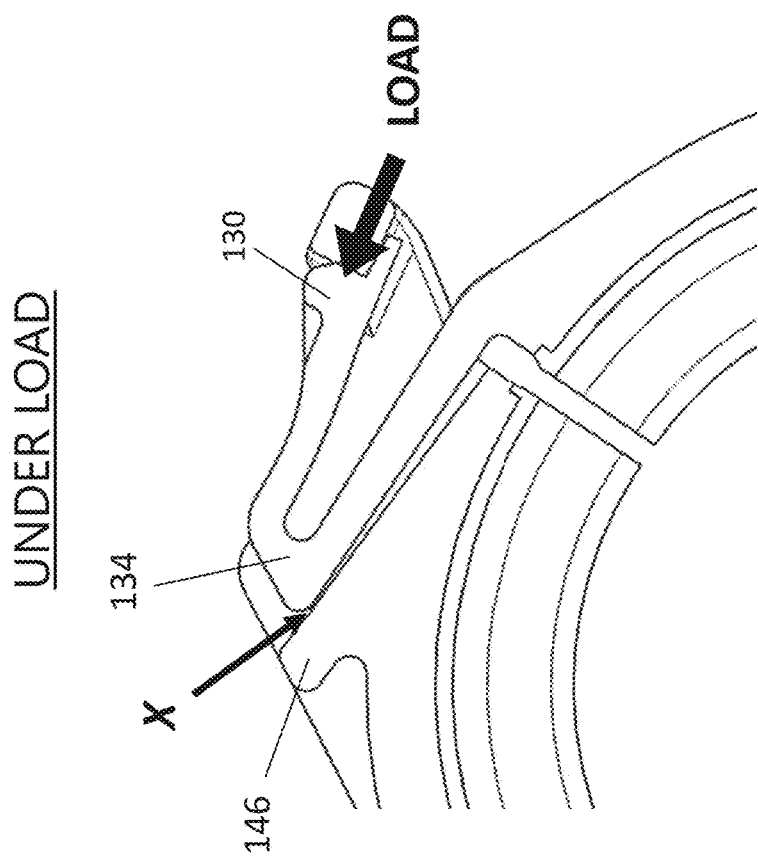
FIG. 43 shows a cross-sectional side view of a clip engaged with a housing according to some embodiments and FIG. 44 shows the clip of FIG. 43 under an applied load.
Figure 43:
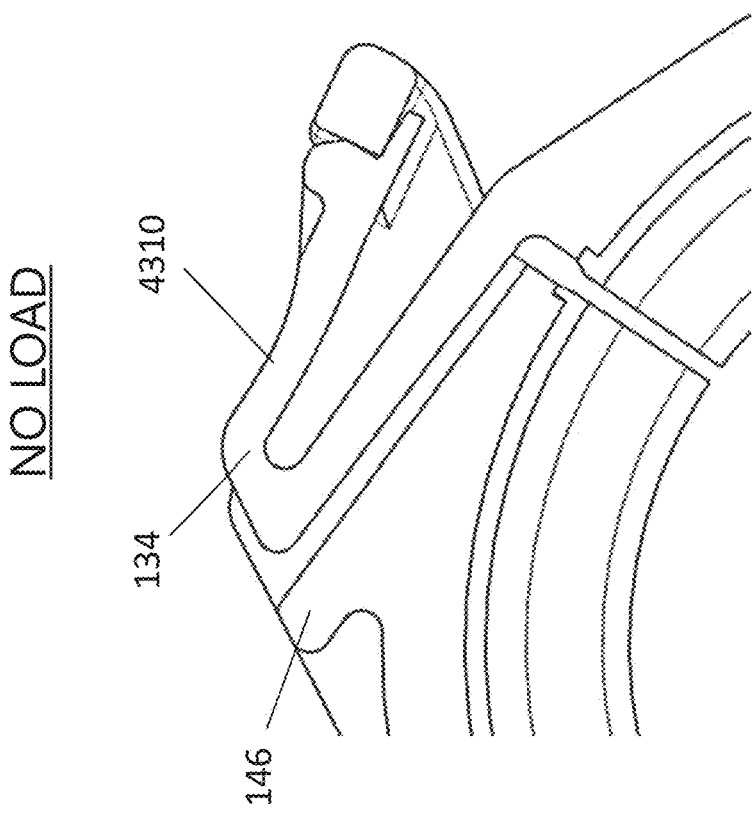

In some embodiments, as shown in FIGS. 43 and 44, the protective wall also may act as a support when the clip is under load, which may increase the strength of the clip. For example, the protective wall may serve as a point of contact (see arrow X in FIG. 44) with the distal end 134 of the clip, which may limit inward deflection of the clip. As can be clearly seen in FIGS. 43 and 44, for example, a portion 4310 of top arm 145a between a feature including second engagement surface 142 and distal end 134 is concave. In this example, the concave portion faces away from the floor of the channel into which the clip is inserted.

In some embodiments, the P-clamp may include additional locking elements, or locks, such as to provide redundancy in the securement of the bundle of wires in the P-clamp. For example, if part of the clip were to break or become inadvertently disengaged such a lock may keep the P-clamp in a closed position to maintain the bundle of wires in the clamp. As shown in FIGS. 57 and 58, in some embodiment, the lock may include a tie strap 148. In some embodiments, the tie strap may be inserted in through a slot 150 extending through the housing of the second clamp member. In some embodiments, the slot may be formed in the first and second sides 149*a*, 149*b* of the housing 132. As will be appreciated, the shape and size of the slot may correspond to the shape and size of the lock (e.g., the tie strap). In some embodiments, the strap is arranged to extend between the first and second arms 145*a*, 145*b* of the clip, and to extend over the first, top arm 145*a* of the clip, and part of the housing. Although the lock is shown as being a tie strap in FIGS. 49 and 50, it will be appreciated that other locks may be used to provide redundancy in the securement of the first and second clamp members.

Although embodiments have been shown and described for securing a wire or bundle of wires via the P-clamp assembly, it will be appreciated that the P-clamp assembly can be used to secure other elongate items, such as hoses or tubes.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A clamp comprising:
   a first clamp member having a substantially U-shaped clip with first and second arms connected at a distal end of the clip; and
   a second clamp member having a housing comprising a channel arranged to receive the clip,
   wherein:
      the first clamp member is separable from and pivotably attached to the second clamp member;
      the second clamp member is in a same plane as and cooperating with the first clamp member to define an opening through which a bundle of wires is insertable;
      the housing further comprises a portion defining a floor of the channel;
      the housing further comprises a portion defining a top of the channel;
      a proximal end of the first arm of the clip comprises a feature arranged to engage with the top to hold the clip in the channel;
      a portion of the first arm of the clip between the feature and the distal end of the clip on a side of the first arm facing away from the floor is concave; and
      the floor comprises a flat portion adjacent the distal end of the clip.

2. The clamp of claim 1, wherein the distal end of the clip is exposed when the clip is engaged with the housing.

3. The clamp of claim 1, wherein the housing includes a first side wall and a second side wall bounding the channel and the top is between the first side wall and the second side wall along a portion of the length of the channel.

4. The clamp of claim 3, wherein each of a first end of the channel and a second end of the channel is open, wherein the clip is insertable into the first end of the channel to engage the clip with the housing.

5. The clamp of claim 3, wherein:
   the top comprises first and second contact surfaces on different sides of the top;
   the feature comprises a projection and the proximal end comprises a tail, the projection and the tail defining first and second engagement surfaces, respectively, arranged to engage with the first and second contact surfaces, respectively, to hold the clip in the channel.

6. The clamp of claim 5, wherein the top of the housing extends along only a portion of a length of the channel such that, when the proximal end of the first arm of the clip is engaged to the top, the top covers at least a portion of the tail and the projection is exposed.

7. The clamp of claim 5, wherein the floor of the channel extends between the proximal end of the first arm and the distal end of the clip, such that the channel floor is configured to limit travel of the proximal end of the first arm and the distal end of the clip.

8. The clamp of claim 1, wherein the clamp includes an inner cushion.

9. The clamp of claim 8, wherein the inner cushion includes one or more lobes extending radially inwardly towards a center of the opening.

10. The clamp of claim 8, wherein the inner cushion includes a first cushion attachable to the first clamp member and a second cushion attachable to the second clamp member, where at least a portion of the first cushion is arranged to overlap a portion of the second cushion when the clamp is in an open position.

11. The clamp of claim 10, wherein the first cushion includes a first protrusion and the second cushion includes a second protrusion, wherein a portion of the first protrusion overlaps a portion of the second protrusion.

12. The clamp of claim 11, wherein each of the first and second protrusions includes an inwardly facing ramped surface.

13. The clamp of claim 1, wherein the first clamp member is pivotably attached to the second clamp member via a hinge.

14. The clamp of claim 13, wherein the hinge includes a hinge hook and hinge pin.

15. The clamp of claim 14, wherein a diameter of the hinge pin decreases from a first end of the hinge pin towards a central region of the hinge pin.

16. The clamp of claim 15, wherein a thickness of the hinge hook increases from a first end of the hinge hook towards a central region of the hinge hook.

17. The clamp of claim 13, wherein the hinge includes a clevis fastener.

18. The clamp of claim 1, wherein the first clamp member includes a mounting flange arranged to attach the clamp to a support.

19. The clamp of claim 1, further comprising a lock, wherein the lock extends around at least the first arm of the clip and a portion of the housing.

20. A clamp comprising:
a first clamp member having a substantially U-shaped clip; and
a second clamp member having a housing arranged to receive the clip, the first and second clamp members cooperating to define an opening through which a bundle of wires is insertable, the second clamp member attached to the first clamp member via a hinge;
wherein the hinge includes a hinge pin and a hinge hook configured to have a snap-fit arrangement such that the hinge pin snaps into the hinge hook in a direction perpendicular to a length of the hinge pin, the hinge pin having a diameter that decreases from a first end of the hinge pin towards a central portion of the hinge pin and the hinge hook having a thickness that increases from a first end of the hinge hook towards a central region of the hinge hook so as to increase the strength of the hinge.

21. The clamp of claim 20, wherein the hinge hook has a thickness that increases from a first end of the hinge hook towards a central region of the hinge hook.

22. A clamp comprising:
a first clamp member having a substantially U-shaped clip with first and second arms connected at a distal end of the clip; and
a second clamp member having a housing arranged to receive the clip, the second clamp member hingeably attached to the first clamp member to define an opening through which a bundle of wires is insertable;
a cushion affixed to the first clamp member and the second clamp member and bounding the opening;
wherein:
the housing includes a channel sized to receive the clip, the channel bounded by first and second sidewalls of the housing, a flat channel floor on a surface of the housing between the first and second sidewalls,
a proximal end of the first arm of the clip arranged to engage with the housing to hold the clip in the housing;
the flat channel floor extends tangentially from a curvature of the second clamp member and is adjacent the distal end of the clip; and
at the distal end of the clip, the second arm of the clip extends beyond the first arm of the clip.

23. A clamp comprising:
a first clamp member bounding a first portion of a circular opening and having a substantially U-shaped clip with first and second arms connected at a distal end of the clip, wherein the distal end of the clip includes a flat portion that slopes in a distal direction from the first arm toward the second arm; and
a second clamp member bounding a second portion of the circular opening and having a housing comprising a channel arranged to receive the clip, the second clamp member cooperating with the first clamp member to define the circular opening through which a bundle of wires is insertable;
wherein:
a first end of the first clamp member is hingeably attached to a first end of the second clamp member;
the clip is at a second end of the first clamp member, opposite the first end of the first clamp member;
the channel is at a second end of the second clamp member, opposite the first end of the second clamp member;
the channel is bounded by portions of the housing of the second clamp member defining a first side wall, a second side wall and a flat floor disposed between the first side wall and the second side wall;
the housing of the second clamp member comprises a top above the channel and extending in a direction from the first side wall to the second side wall;
a portion of an outwardly facing side of the first arm of the clip is arranged to be exposed when the clip is engaged with the housing, and the outwardly facing side has a projection and a tail extending beyond the projection at a proximal end of the first arm; and
the projection and tail are configured to engage different surfaces of the top such that, when the second end of the first clamp member is engaged to the second end of the second clamp member, the distal end of the clip is adjacent the flat floor of the channel and the proximal end of the first arm of the clip is engaged to the top with the exposed portion of the outwardly facing side of the first arm disposed between the top and the distal end of the clip.

24. The clamp of claim 23, further comprising:
a cushion within the circular opening and affixed to the first clamp member and the second clamp member.

25. The clamp of claim 1, wherein:
the first clamp member is pivotably attached to the second clamp member via a hinge comprising a first component integrally formed with the first clamp member and a second component integrally formed with the second clamp member; and
the first and second components of the hinge have corresponding geometries such that, when engaged, they are rotatable with respect to each other.

26. The clamp of claim 1, wherein: the portion of the first arm comprises an outwardly facing side of the first arm and is arranged to be exposed when the clip is engaged with the housing.

* * * * *